US011751257B2

(12) United States Patent
Damnjanovic et al.

(10) Patent No.: US 11,751,257 B2
(45) Date of Patent: Sep. 5, 2023

(54) TECHNOLOGY NEUTRAL COEXISTENCE AND HIGH PRIORITY TRAFFIC IN UNLICENSED FREQUENCY BANDS

(71) Applicant: QUALCOMM Incorporated, San Diego, CA (US)

(72) Inventors: Aleksandar Damnjanovic, Del Mar, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 16/803,733

(22) Filed: Feb. 27, 2020

(65) Prior Publication Data
US 2020/0281027 A1    Sep. 3, 2020

Related U.S. Application Data

(60) Provisional application No. 62/820,649, filed on Mar. 19, 2019, provisional application No. 62/814,245, (Continued)

(51) Int. Cl.
H04W 74/08    (2009.01)
H04W 16/14    (2009.01)

(52) U.S. Cl.
CPC ....... *H04W 74/0891* (2013.01); *H04W 16/14* (2013.01)

(58) Field of Classification Search
CPC .. H04W 16/14; H04W 56/00; H04W 74/0891
See application file for complete search history.

(56) References Cited

U.S. PATENT DOCUMENTS

| 10,177,875 B2* | 1/2019 | Dinan | H04L 1/0023 |
| 2009/0137206 A1* | 5/2009 | Sherman | H04W 16/14 |
| | | | 455/41.2 |

(Continued)

OTHER PUBLICATIONS

Huawei et al., "Coexistence and Channel Access for NR Unlicensed Band Operations," 3GPP Draft, 3GPP TSG RAN WG1 Ad-Hoc Meeting 1901, R1-1900060, 3rd Generation Partnership Project (3GPP), Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 11, 2019 (Jan. 11, 2019), XP051575686, 16 pages, Retrieved from the Internet:URL:http://www.3gpp.org/ftp/tsg%5Fran/WG1%5FRL1/TSGR1%5FAH/NR%5FAH%5F1901/Docs/R1%2D1900060%2Ezip, [retrieved on Jan. 11, 2019], Section 2.2, sections: 2.1.1 LBT type for NR-U UL physical channels, 2 .1.2 LBT type for NR-U DL signals and channels, 2.3 cws adjustment . Fig. 1 Impact of CB mapping on CWS adjustment and retransmission efficiency; Fig. 3 CWS adjustment for 2-step RACH; Figure 4 CWS adjustment in 4-step RACH; 2.6 Receiver-assisted LBT; 2.7 Joint channel access of neighbouring TRPs (Spatial Reuse); sub-section, "LBT for transmission alignment", Fig. 3 Illustration of joint TRP channel access using LBT deferral with individual backoff aligned to end at the common start point ttarget. When successful, 3 Conclusions.

(Continued)

*Primary Examiner* — Charles N Appiah
*Assistant Examiner* — Nicole M Louis-Fils
(74) *Attorney, Agent, or Firm* — Norton Rose Fulbright US LLP

(57) ABSTRACT

Technology neutral coexistence and high priority traffic is disclosed for use in unlicensed frequency bands. Synchronization boundaries are defined in which synchronous contention windows across all radio access technologies attempting access to a shared communication channel occur periodically. Between the synchronous contention windows, (Continued)

the nodes may return to asynchronous access procedures. Such synchronous access procedures may be applicable to certain power classes or deployment type nodes. Additionally, various priority schemes for the synchronous contention window may be used to ensure protection of higher priority nodes or traffic, such as ultra-reliable low latency communication (URLLC) traffic. According to certain aspects, the deployment of such synchronous access methodology may be triggered via signaling from initiating devices. Additional aspects may provide for a technology neutral receiver protection mechanism by defining resources for protection signaling during receiver protection intervals between successive synchronous contention windows.

19 Claims, 19 Drawing Sheets

Related U.S. Application Data filed on Mar. 5, 2019, provisional application No. 62/813,392, filed on Mar. 4, 2019, provisional application No. 62/812,842, filed on Mar. 1, 2019.

(56) References Cited

U.S. PATENT DOCUMENTS

| | | | |
|---|---|---|---|
| 2013/0155931 A1* | 6/2013 | Prajapati | H04B 15/00 370/336 |
| 2017/0094546 A1* | 3/2017 | Chai | H04W 16/14 |
| 2017/0201943 A1* | 7/2017 | Hsu | H04W 52/0225 |
| 2018/0110063 A1* | 4/2018 | Fan | H04W 72/0446 |
| 2018/0160439 A1 | 6/2018 | Deparis et al. | |
| 2018/0176955 A1 | 6/2018 | Salem et al. | |
| 2020/0314844 A1* | 10/2020 | Tomeba | H04W 88/10 |
| 2020/0374892 A1* | 11/2020 | Kusashima | H04W 28/0268 |
| 2021/0227581 A1* | 7/2021 | Karaki | H04W 72/1289 |

OTHER PUBLICATIONS

International Search Report and Written Opinion—PCT/US2020/020370—ISA/EPO—dated Jun. 26, 2020 (191699WO).
Nokia et al., "Feature Lead's Summary on Channel Access Procedures", 3GPP Draft, 3GPP TSG RAN WG1 Meeting #96, R1-1903499 NRU Channel Access Summary RAN1 96 WED Morning, 3rd Generation Partnership Project (3GPP), Mobile Competence Centre, 650, Route Des Lucioles, F-06921, vol. RAN WG1, No. Athens. Greece, Feb. 25, 2019-Mar. 1, 2019 Feb. 27, 2019 (Feb. 27, 2019), XP051601163, 20 Pages, Retrieved from the Internet: URL:http://www.3gpp.org/ftp/tsg%5Fran/WG1%5FRL1/TSGR1%5F96/Docs/R1%2D1903499%2Ezip [retrieved on Feb. 27, 2019] section: 2.5 CWS adjustment—see all views and proposals of different companies; section: 2.11 Channel Access for Configured Grants—see all views and proposals of different companies.

* cited by examiner

TECHNOLOGY NEUTRAL COEXISTENCE AND HIGH PRIORITY TRAFFIC IN UNLICENSED FREQUENCY BANDS

CROSS-REFERENCE TO RELATED APPLICATIONS

This application claims the benefit of U.S. Provisional Patent Application No. 62/812,842, entitled, "TECHNOLOGY NEUTRAL COEXISTENCE AND HIGH PRIORITY TRAFFIC IN UNLICENSED FREQUENCY BANDS," filed on Mar. 1, 2019, U.S. Provisional Patent Application No. 62/813,392, entitled, "TECHNOLOGY NEUTRAL COEXISTENCE AND HIGH PRIORITY TRAFFIC IN UNLICENSED FREQUENCY BANDS," filed on Mar. 4, 2019, U.S. Provisional Patent Application No. 62/814,245, entitled, "TECHNOLOGY NEUTRAL COEXISTENCE AND HIGH PRIORITY TRAFFIC IN UNLICENSED FREQUENCY BANDS," filed on Mar. 5, 2019, and U.S. Provisional Patent Application No. 62/820,649, entitled, "TECHNOLOGY NEUTRAL COEXISTENCE AND HIGH PRIORITY TRAFFIC IN UNLICENSED FREQUENCY BANDS," filed on Mar. 19, 2019, which is expressly incorporated by reference herein in its entirety.

BACKGROUND

Field

Aspects of the present disclosure relate generally to wireless communication systems, and more particularly, to technology neutral coexistence and high priority traffic in unlicensed frequency bands.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes obtaining, by a wireless node, a synchronization boundary configuration for a shared communication channel, wherein the synchronization boundary configuration defines a synchronous contention window and periodicity for synchronous access contention by all accessing nodes of one or more radio access technologies, identifying, by the wireless node, a next synchronous contention window according to the synchronization boundary configuration using an absolute system timing reference, initiating, by the wireless node, a synchronous contention procedure at the next synchronous contention window, conducting, by the wireless node, transmissions according to a result of the synchronous contention procedure, and returning, by the wireless node, to asynchronous access contention for one or more asynchronous contention windows after the next synchronous contention window and prior to a subsequent synchronous contention window.

In an additional aspect of the disclosure, an apparatus configured for wireless communications includes means for obtaining, by a wireless node, a synchronization boundary configuration for a shared communication channel, wherein the synchronization boundary configuration defines a synchronous contention window and periodicity for synchronous access contention by all accessing nodes of one or more radio access technologies, means for identifying, by the wireless node, a next synchronous contention window according to the synchronization boundary configuration using an absolute system timing reference, means for initiating, by the wireless node, a synchronous contention procedure at the next synchronous contention window, means for conducting, by the wireless node, transmissions according to a result of the synchronous contention procedure, and means for returning, by the wireless node, to asynchronous access contention for one or more asynchronous contention windows after the next synchronous contention window and prior to a subsequent synchronous contention window.

In an additional aspect of the disclosure, a non-transitory computer-readable medium having program code recorded thereon. The program code further includes code to obtain, by a wireless node, a synchronization boundary configuration for a shared communication channel, wherein the synchronization boundary configuration defines a synchronous contention window and periodicity for synchronous access contention by all accessing nodes of one or more radio access technologies, code to identify, by the wireless node, a next synchronous contention window according to the synchronization boundary configuration using an absolute system timing reference, code to initiate, by the wireless node, a synchronous contention procedure at the next synchronous contention window, code to conduct, by the wireless node, transmissions according to a result of the synchronous contention procedure, and code to return, by the wireless node, to asynchronous access contention for one or more asynchronous contention windows after the next synchronous contention window and prior to a subsequent synchronous contention window.

In an additional aspect of the disclosure, an apparatus configured for wireless communication is disclosed. The apparatus includes at least one processor, and a memory coupled to the processor. The processor is configured to obtain, by a wireless node, a synchronization boundary configuration for a shared communication channel, wherein the synchronization boundary configuration defines a synchronous contention window and periodicity for synchronous access contention by all accessing nodes of one or more radio access technologies, to identify, by the wireless node, a next synchronous contention window according to the synchronization boundary configuration using an absolute system timing reference, to initiate, by the wireless node, a synchronous contention procedure at the next synchronous contention window, to conduct, by the wireless node, transmissions according to a result of the synchronous contention procedure, and to return, by the wireless node, to asynchronous access contention for one or more asynchronous contention windows after the next synchronous contention window and prior to a subsequent synchronous contention window.

In an additional aspect of the disclosure, a method of wireless communication includes obtaining, by a wireless node, a synchronization boundary configuration for a shared communication channel, wherein the synchronization boundary configuration defines synchronous access parameters for periodic synchronous access contention by all accessing nodes of one or more radio access technologies, attempting, by the wireless node, transmissions on the shared communication channel using a synchronous contention procedure at a next synchronous contention window determined according to the synchronous access parameters, configuring, by the wireless node in response to detection of data for transmission in a buffer of the wireless node, one or more preferred contention windows between the next synchronous contention window and the subsequent synchronous contention window, attempting, by the wireless node, access of the shared communication channel for further transmissions of the data at a next preferred contention window of the one or more preferred contention windows, and in response to success of the access, ceasing, by the wireless node, the further transmissions at a boundary of a subsequent preferred contention window of the one or more preferred contention windows when a portion of the data remains in the buffer.

In an additional aspect of the disclosure, an apparatus configured for wireless communications includes means for obtaining, by a wireless node, a synchronization boundary configuration for a shared communication channel, wherein the synchronization boundary configuration defines synchronous access parameters for periodic synchronous access contention by all accessing nodes of one or more radio access technologies, means for attempting, by the wireless node, transmissions on the shared communication channel using a synchronous contention procedure at a next synchronous contention window determined according to the synchronous access parameters, means for configuring, by the wireless node in response to detection of data for transmission in a buffer of the wireless node, one or more preferred contention windows between the next synchronous contention window and the subsequent synchronous contention window, means for attempting, by the wireless node, access of the shared communication channel for further transmissions of the data at a next preferred contention window of the one or more preferred contention windows, and means, executable in response to success of the access, for ceasing, by the wireless node, the further transmissions at a boundary of a subsequent preferred contention window of the one or more preferred contention windows when a portion of the data remains in the buffer.

In an additional aspect of the disclosure, a non-transitory computer-readable medium having program code recorded thereon. The program code further includes code to obtain, by a wireless node, a synchronization boundary configuration for a shared communication channel, wherein the synchronization boundary configuration defines synchronous access parameters for periodic synchronous access contention by all accessing nodes of one or more radio access technologies, code to attempt, by the wireless node, transmissions on the shared communication channel using a synchronous contention procedure at a next synchronous contention window determined according to the synchronous access parameters, code to configure, by the wireless node in response to detection of data for transmission in a buffer of the wireless node, one or more preferred contention windows between the next synchronous contention window and the subsequent synchronous contention window, code to attempt, by the wireless node, access of the shared communication channel for further transmissions of the data at a next preferred contention window of the one or more preferred contention windows, and code, executable in response to success of the access, to cease, by the wireless node, the further transmissions at a boundary of a subsequent preferred contention window of the one or more preferred contention windows when a portion of the data remains in the buffer.

In an additional aspect of the disclosure, an apparatus configured for wireless communication is disclosed. The apparatus includes at least one processor, and a memory coupled to the processor. The processor is configured to obtain, by a wireless node, a synchronization boundary configuration for a shared communication channel, wherein the synchronization boundary configuration defines synchronous access parameters for periodic synchronous access contention by all accessing nodes of one or more radio access technologies, to attempt, by the wireless node, transmissions on the shared communication channel using a synchronous contention procedure at a next synchronous contention window determined according to the synchronous access parameters, to configure, by the wireless node in response to detection of data for transmission in a buffer of the wireless node, one or more preferred contention windows between the next synchronous contention window and the subsequent synchronous contention window, to attempt, by the wireless node, access of the shared communication channel for further transmissions of the data at a next preferred contention window of the one or more preferred contention windows, and to cease, by the wireless node, the further transmissions at a boundary of a subsequent preferred contention window of the one or more preferred contention windows when a portion of the data remains in the buffer, in response to success of the access.

In an additional aspect of the disclosure, a method of wireless communication includes obtaining, by a wireless node, a synchronization boundary configuration for a shared communication channel, wherein the synchronization boundary configuration defines a synchronous contention window and periodicity for synchronous access contention by all accessing nodes of one or more radio access technologies, identifying, by the wireless node, a next synchronous contention window according to the synchronization boundary configuration using an absolute system timing reference, initiating, by the wireless node, a synchronous contention procedure at the next synchronous contention window, conducting, by the wireless node, transmissions according to a result of the synchronous contention procedure, and returning, by the wireless node, to asynchronous access contention for one or more asynchronous contention windows after the next synchronous contention window and prior to a subsequent synchronous contention window.

In an additional aspect of the disclosure, an apparatus configured for wireless communications includes means for obtaining, by a wireless node, a synchronization boundary configuration for a shared communication channel, wherein the synchronization boundary configuration defines a synchronous contention window and periodicity for synchronous access contention by all accessing nodes of one or more radio access technologies, means for identifying, by the wireless node, a next synchronous contention window according to the synchronization boundary configuration using an absolute system timing reference, means for initiating, by the wireless node, a synchronous contention procedure at the next synchronous contention window, means for conducting, by the wireless node, transmissions according to a result of the synchronous contention procedure, and means for returning, by the wireless node, to asynchronous access contention for one or more asynchronous contention windows after the next synchronous contention window and prior to a subsequent synchronous contention window.

In an additional aspect of the disclosure, a non-transitory computer-readable medium having program code recorded thereon. The program code further includes code to obtain, by a wireless node, a synchronization boundary configuration for a shared communication channel, wherein the synchronization boundary configuration defines a synchronous contention window and periodicity for synchronous access contention by all accessing nodes of one or more radio access technologies, code to identify, by the wireless node, a next synchronous contention window according to the synchronization boundary configuration using an absolute system timing reference, code to initiate, by the wireless node, a synchronous contention procedure at the next synchronous contention window, code to conduct, by the wireless node, transmissions according to a result of the synchronous contention procedure, and code to return, by the wireless node, to asynchronous access contention for one or more asynchronous contention windows after the next synchronous contention window and prior to a subsequent synchronous contention window.

In an additional aspect of the disclosure, an apparatus configured for wireless communication is disclosed. The apparatus includes at least one processor, and a memory coupled to the processor. The processor is configured to obtain, by a wireless node, a synchronization boundary configuration for a shared communication channel, wherein the synchronization boundary configuration defines a synchronous contention window and periodicity for synchronous access contention by all accessing nodes of one or more radio access technologies, to identify, by the wireless node, a next synchronous contention window according to the synchronization boundary configuration using an absolute system timing reference, to initiate, by the wireless node, a synchronous contention procedure at the next synchronous contention window, to conduct, by the wireless node, transmissions according to a result of the synchronous contention procedure, and to return, by the wireless node, to asynchronous access contention for one or more asynchronous contention windows after the next synchronous contention window and prior to a subsequent synchronous contention window.

In an additional aspect of the disclosure, a method of wireless communication includes obtaining, by a wireless node, a synchronization boundary configuration for a shared communication channel, wherein the synchronization boundary configuration defines synchronous access parameters for periodic synchronous access contention by all accessing nodes of one or more radio access technologies, deriving, by the wireless node, a plurality of synchronizing boundaries based on the synchronous access parameters relative to an absolute timing reference, wherein the synchronous access parameters include a synchronizing boundary location and a periodicity of the plurality of synchronizing boundaries, determining, by the wireless node, a condition at the wireless node associated with synchronous operation, initiating, by the wireless node in response to the condition, a synchronous contention procedure during a current synchronization period between a last prior synchronizing boundary and a next current synchronizing boundary at the end of the current synchronization period, participating, by the wireless node, in a communication burst in response to success of the synchronous contention procedure, wherein a length of the communication burst is set by the wireless node up to a maximum length of two times the periodicity, and stopping, by the wireless node, the participating in the communication burst at a next synchronizing boundary after the length.

In an additional aspect of the disclosure, an apparatus configured for wireless communication includes means for obtaining, by a wireless node, a synchronization boundary configuration for a shared communication channel, wherein the synchronization boundary configuration defines synchronous access parameters for periodic synchronous access contention by all accessing nodes of one or more radio access technologies, means for deriving, by the wireless node, a plurality of synchronizing boundaries based on the synchronous access parameters relative to an absolute timing reference, wherein the synchronous access parameters include a synchronizing boundary location and a periodicity of the plurality of synchronizing boundaries, means for determining, by the wireless node, a condition at the wireless node associated with synchronous operation, means for initiating, by the wireless node in response to the condition, a synchronous contention procedure during a current synchronization period between a last prior synchronizing boundary and a next current synchronizing boundary at the end of the current synchronization period, means for participating, by the wireless node, in a communication burst in response to success of the synchronous contention procedure, wherein a length of the communication burst is set by the wireless node up to a maximum length of two times the periodicity, and means for stopping, by the wireless node, the participating in the communication burst at a next synchronizing boundary after the length.

In an additional aspect of the disclosure, a non-transitory computer-readable medium having program code recorded thereon. The program code further includes code to obtain, by a wireless node, a synchronization boundary configuration for a shared communication channel, wherein the synchronization boundary configuration defines synchronous access parameters for periodic synchronous access contention by all accessing nodes of one or more radio access technologies, code to derive, by the wireless node, a plurality of synchronizing boundaries based on the synchronous access parameters relative to an absolute timing reference, wherein the synchronous access parameters include a synchronizing boundary location and a periodicity of the plurality of synchronizing boundaries, code to determine, by the wireless node, a condition at the wireless node associated with synchronous operation, code to initiate, by the wireless node in response to the condition, a synchronous contention procedure during a current synchronization period between a last prior synchronizing boundary and a next current synchronizing boundary at the end of the current synchronization period, code to participate, by the wireless node, in a communication burst in response to success of the synchronous contention procedure, wherein a length of the communication burst is set by the wireless node up to a maximum length of two times the periodicity, and code to stop, by the wireless node, execution of the code to participate in the communication burst at a next synchronizing boundary after the length.

In an additional aspect of the disclosure, an apparatus configured for wireless communication is disclosed. The apparatus includes at least one processor, and a memory coupled to the processor. The processor is configured to obtain, by a wireless node, a synchronization boundary configuration for a shared communication channel, wherein the synchronization boundary configuration defines synchronous access parameters for periodic synchronous access contention by all accessing nodes of one or more radio access technologies, to derive, by the wireless node, a plurality of synchronizing boundaries based on the synchronous access parameters relative to an absolute timing reference, wherein the synchronous access parameters include a synchronizing boundary location and a periodicity of the plurality of synchronizing boundaries, to determine, by the wireless node, a condition at the wireless node associated with synchronous operation, to initiate, by the wireless node in response to the condition, a synchronous contention procedure during a current synchronization period between a last prior synchronizing boundary and a next current synchronizing boundary at the end of the current synchronization period, to participate, by the wireless node, in a communication burst in response to success of the synchronous contention procedure, wherein a length of the communication burst is set by the wireless node up to a maximum length of two times the periodicity, and to stop, by the wireless node, execution of configuration to participate in the communication burst at a next synchronizing boundary after the length.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
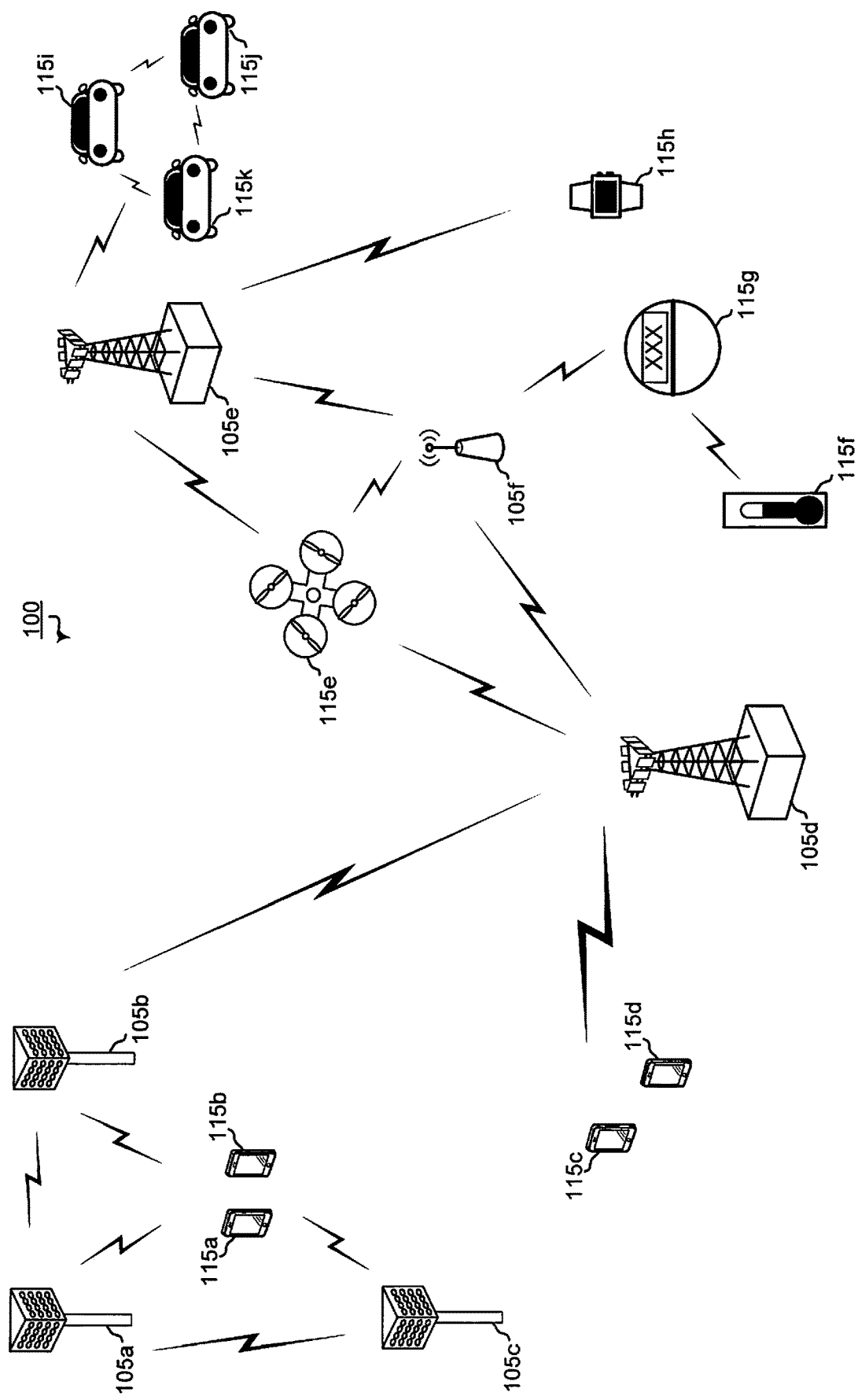
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
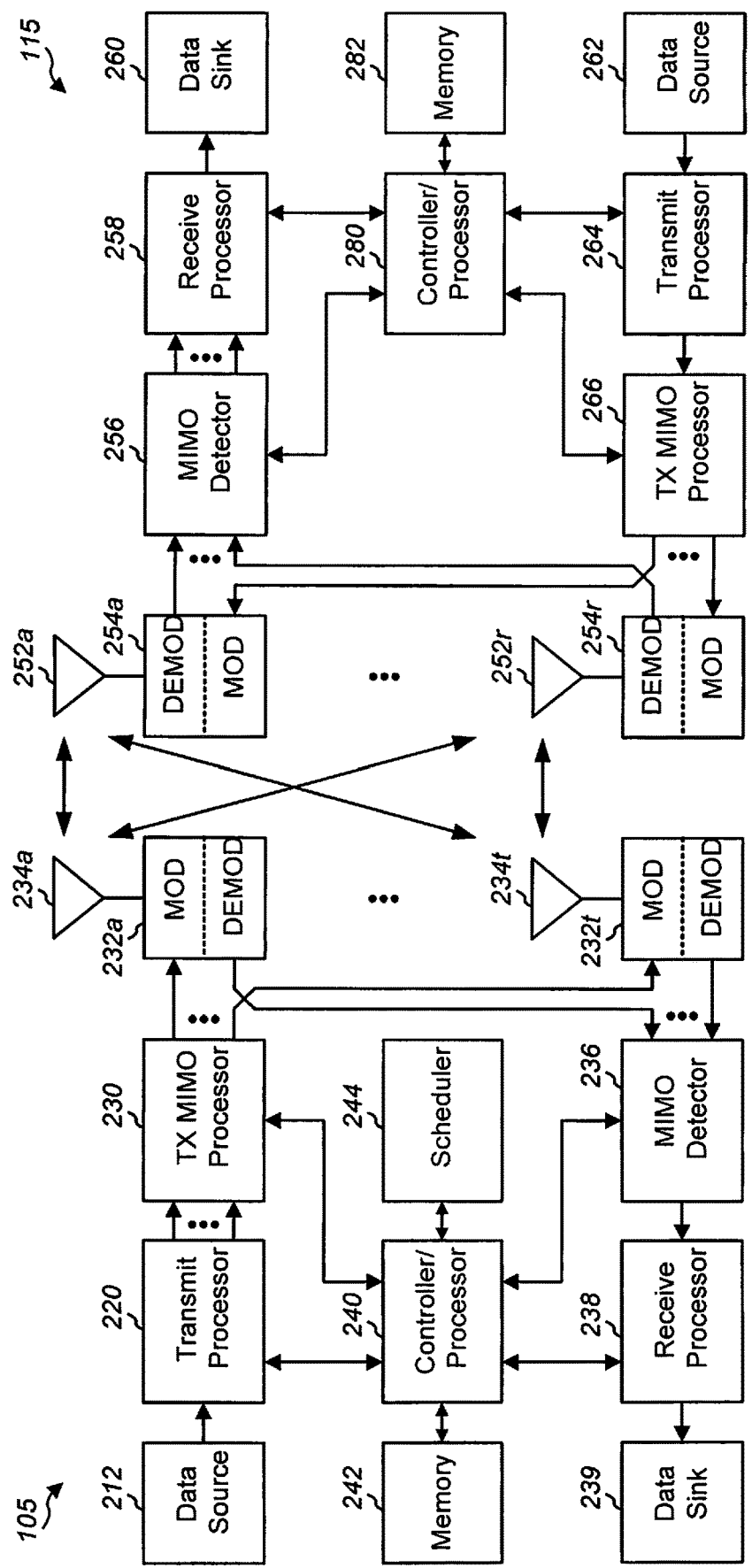
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
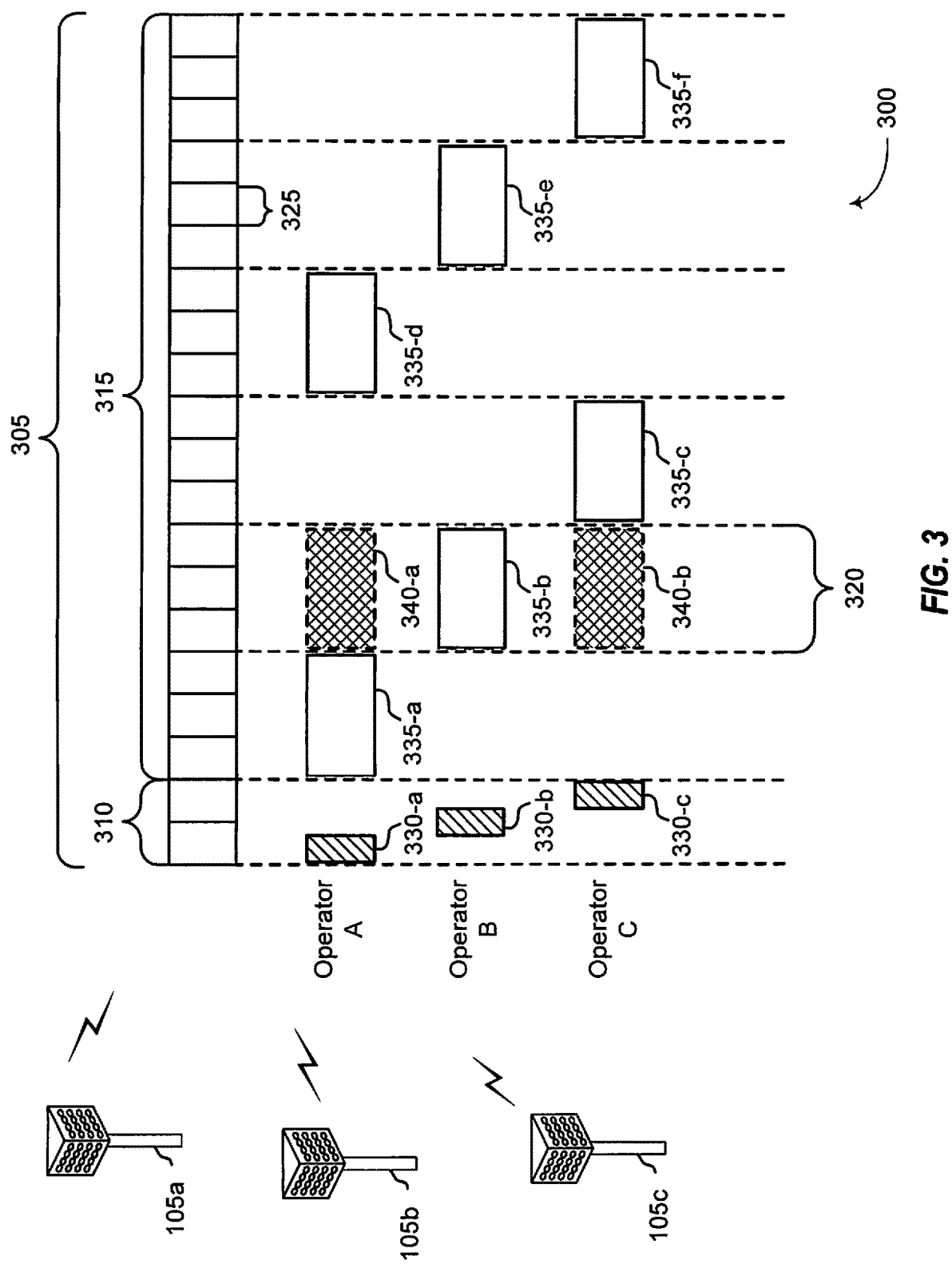
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* (e.g., G-INT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

As wireless technologies advance, mobile network operator (MNO)-driven wide-area networks will continue servicing traditional use cases. 5G technology is expected to expand beyond traditional use cases to new applications in healthcare, industrial internet-of-things (HOT), etc. Certain non-traditional use case scenarios may benefit from solutions to current issues in order to meet the stringent need of ultra-reliable, low latency communication (URLLC) services. In a mission critical (MiCr) application, URLLC operations may expect a $10^{-6}$ packet error rate, ms latency, all in multi-year 24 hour, 7 days per week (24/7) operation. Extending into NR features, 5G NR-U will have support for both license assisted access (LAA), in which unlicensed channels are assisted by licensed channels for guaranteed communications, and standalone mode.

In an IIOT application, factory automation communication would usually be cyclic with each cycle including URLLC operations. The packet arrival process is typically periodic and predictable or deterministic, such that the periodicity is considered the cycle time. In such factory automation scenarios, the packet arrival process may be synchronized across all UEs, may be symmetric in the downlink and uplink directions, and include small packets (e.g., ones or tens of bytes). Losing a single packet, even temporarily and occasionally, would disrupt an automation process that might cause shut down of an entire industrial operation. One potential idea for improving service availability and thus, opening the door for URLLC service for industrial/hospital applications in unlicensed/shared bands, is to open wireless operations in the 6 GHz band (e.g., unlicensed national information infrastructure (UNII)-7). Moreover, consideration may be given to facilitating advanced technologies, such as Coordinated Multipoint (CoMP) transmissions, in unlicensed/shared bands of the 6 GHz band.

Spectrum availability continues to be at the forefront of discussions for increasing wireless service access. The primary target for NR-U deployments has been thought to be the 5 GHz band and the upcoming 6 GHz band. The existing medium access procedure in the unlicensed 5 GHz band can create a number of issues that may result in poor performance, thus, making unlicensed spectrum inadequate for such new high priority applications. The 5 GHz band, which may be shared with other radio access technologies, such as WiFi, may suffer interference caused by hidden and exposed nodes, loose quality of service (QoS) control, and inadequate support for new advanced transmission techniques, such as CoMP, etc.

In responding to demands by various high tech companies for more "mid-band" unlicensed spectrum to supplement the unlicensed spectrum already available in the 5 GHz band, consideration has been made by governmental authorities to open the 6 GHz band (e.g., 5.925-7.125 GHz) for unlicensed use. The 6 GHz band is currently used by licensed incumbents, such as fixed, mobile, and satellite services. In order to open the 6 GHz band, sophisticated sharing mechanisms will be used to protect these licensed incumbents. Because the 6 GHz band has not been open to unlicensed use, it does not have "legacy" secondary users. As such, it offers a good opportunity to develop new procedures that may support these new use-cases in the unlicensed spectrum. Various aspects of the present disclosure are directed to providing technology neutral medium access rules that allow for advanced uses for unlicensed spectrum.

Figure 4:
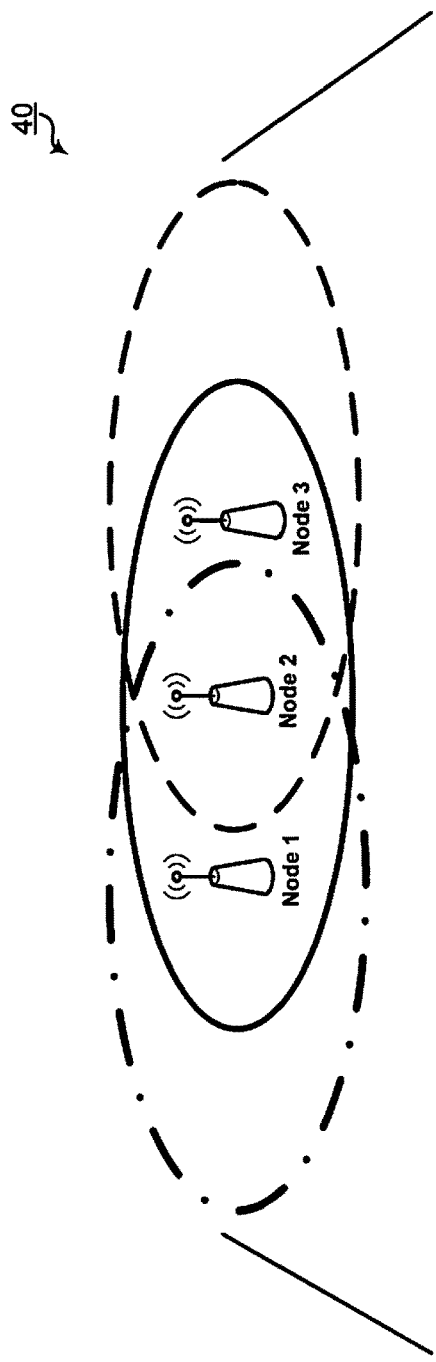
FIG. 4 is a block diagram illustrating a generic NR-U network operating according to legacy medium access procedures.
Figure 4:
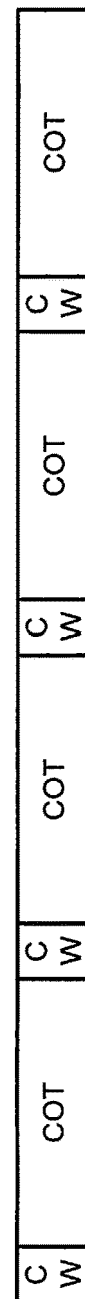
Figure 4:
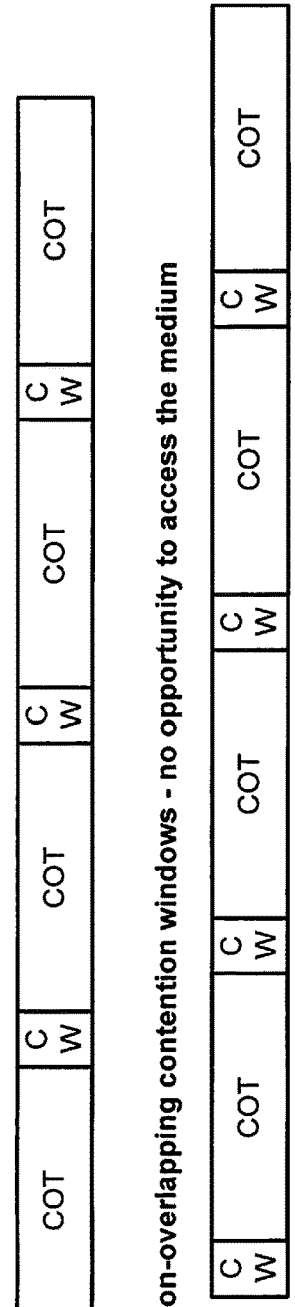
Figure 4:
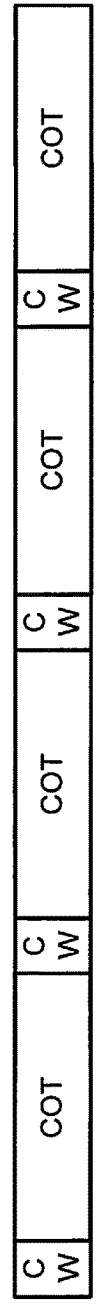
Figure 4:
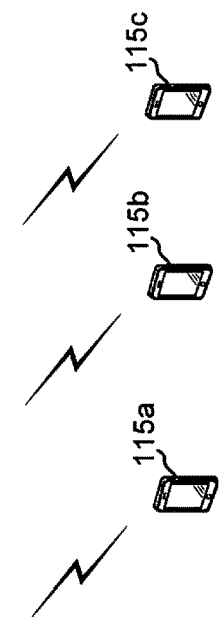

FIG. 4 is a block diagram illustrating a generic NR-U network 40 operating according to legacy medium access procedures. As illustrated, three wireless nodes, nodes 1-3, have been situated such that the coverage areas of each node substantially overlaps with the coverage area of the other nodes. Nodes 1 and 3 may have portions of its coverage area that are not overlapped by the other nodes, respectively. However, the coverage area of node 2 is completely overlapped by either the coverage area of node 1 or node 3. FIG. 4 further shows the illustrative timelines for each of nodes 1-3. In providing communications with UEs 115a-c, the medium access procedure for each node includes contention windows in which each node may contend for the shared communication channel. However, while scenarios exist where node 1 and 3 may have a successful contention procedure to secure channel occupancy times (COTs) for communications, because none of the contention windows for each of nodes 1-3 overlaps, node 2 will not have an opportunity to access the medium as long as nodes 1 and 3 are not within the sensing range of each other and are using the medium.

With current medium access rule, the existing listen before talk (LBT) schemes may suffer from starvation (e.g., failure to secure channel access) due to interference experienced from exposed or hidden nodes. The medium access procedure is further not well defined for CoMP operations. Trigger-based schemes used for uplink multi-user multiple input, multiple output (MU-MIMO) operations may not be considered "fair" due to the potentially higher transmit power of the access points compared to its clients. Additionally, there is no current or practical technology neutral way to protect the receiver. When defined in WiFi operations, receiver protection techniques have not perform well in heavily loaded scenarios when WiFi preambles are not detected due to low signal-to-interference plus noise ratio (SINR).

Synchronous access schemes have been suggested to improve handling of such issues. Synchronization can improve fairness since it enables overlapping contention window. It mitigates exposed node interference issues. Each node can get fair share of the medium. In addition, it can help mitigate hidden node interference problems since at a given time, all nodes monitor control signaling. Moreover, receiver protection, analogous to clear-to-send (CTS) message is possible to achieve in a technology neutral way.

In A CoMP scenario, adjacent transmission-reception points (TRP) can block each other's channel access and significantly reduce any gains that would normally be achievable through CoMP operations. Synchronization of access contention allows overlapping of the contention windows among TRPs and across operators, which can help realize the CoMP operation gains in a multi-operator scenario. When medium access is successful, the system behavior can be closer to the licensed spectrum networks than typical unlicensed, which results ultimately in better performance. Otherwise, CoMP operations based on independent TRP contention would rely on triggers and would result in creating localized clusters that may be suboptimal.

In order to make the 6 GHz (UNII-7) band suitable for MiCr applications, such as IIOT URLLC service, efforts should be made to keep it clean from the transmission from unmanaged devices with no active probing by clients or mobile access points. Additionally, a technology neutral mechanism may be defined that minimizes interference to such services. Other nodes can sense the presence of the IIOT URLLC traffic and avoid using the same channel. A future-proof medium access procedure may further be defined for more advanced transmission technologies such as CoMP and enhanced mobile broadband (eMBB) service. In such technologies, the load based equipment (LBE) medium access procedure to use, at least in part, synchronized contention windows. When such medium access is successfully accessed, the system behavior may be closer to licensed spectrum networks than typical unlicensed.

Figure 5:
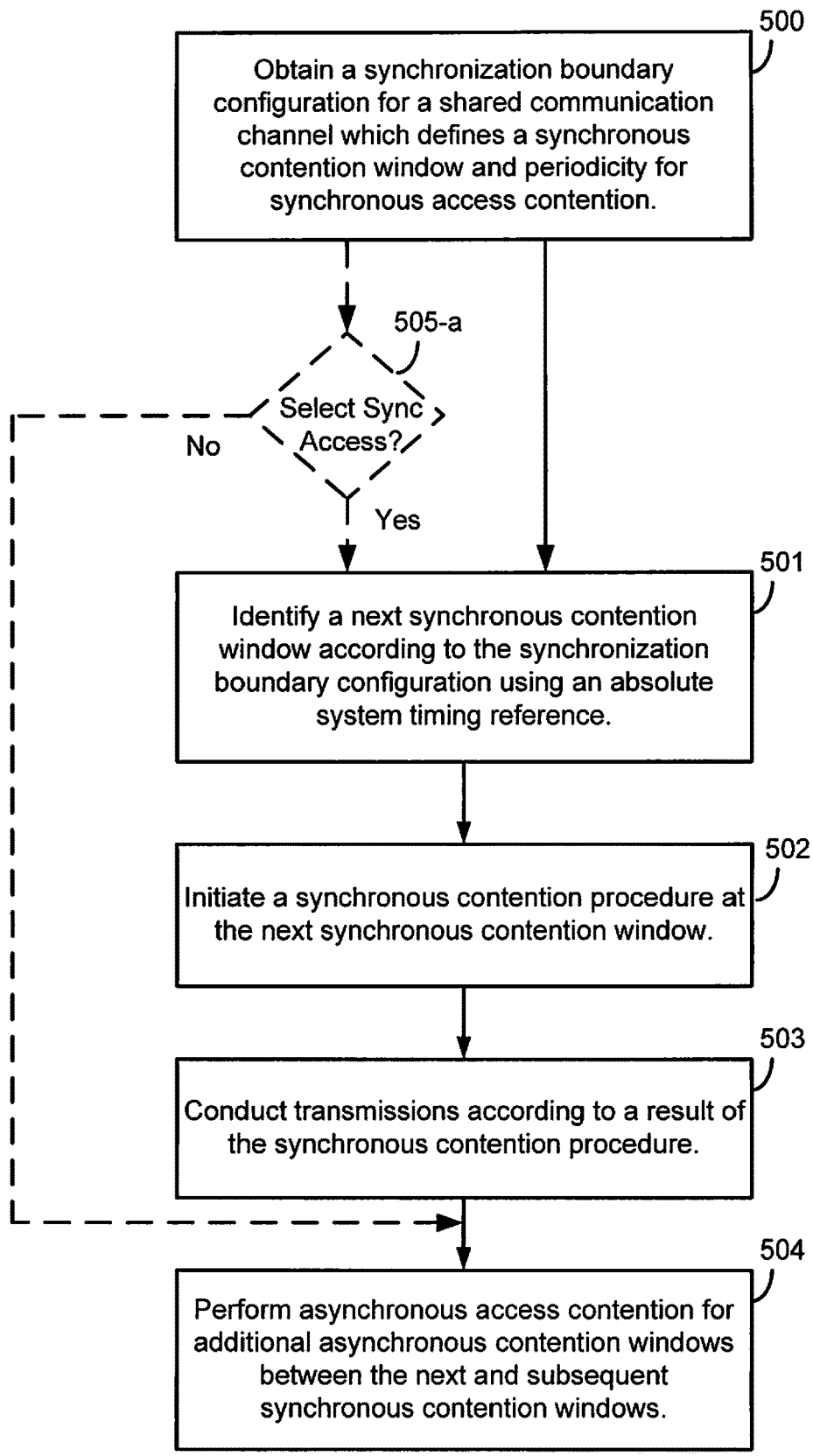
FIG. 5 is a block diagram illustrating example blocks executed to implement one aspect of the present disclosure.
Figure 12:
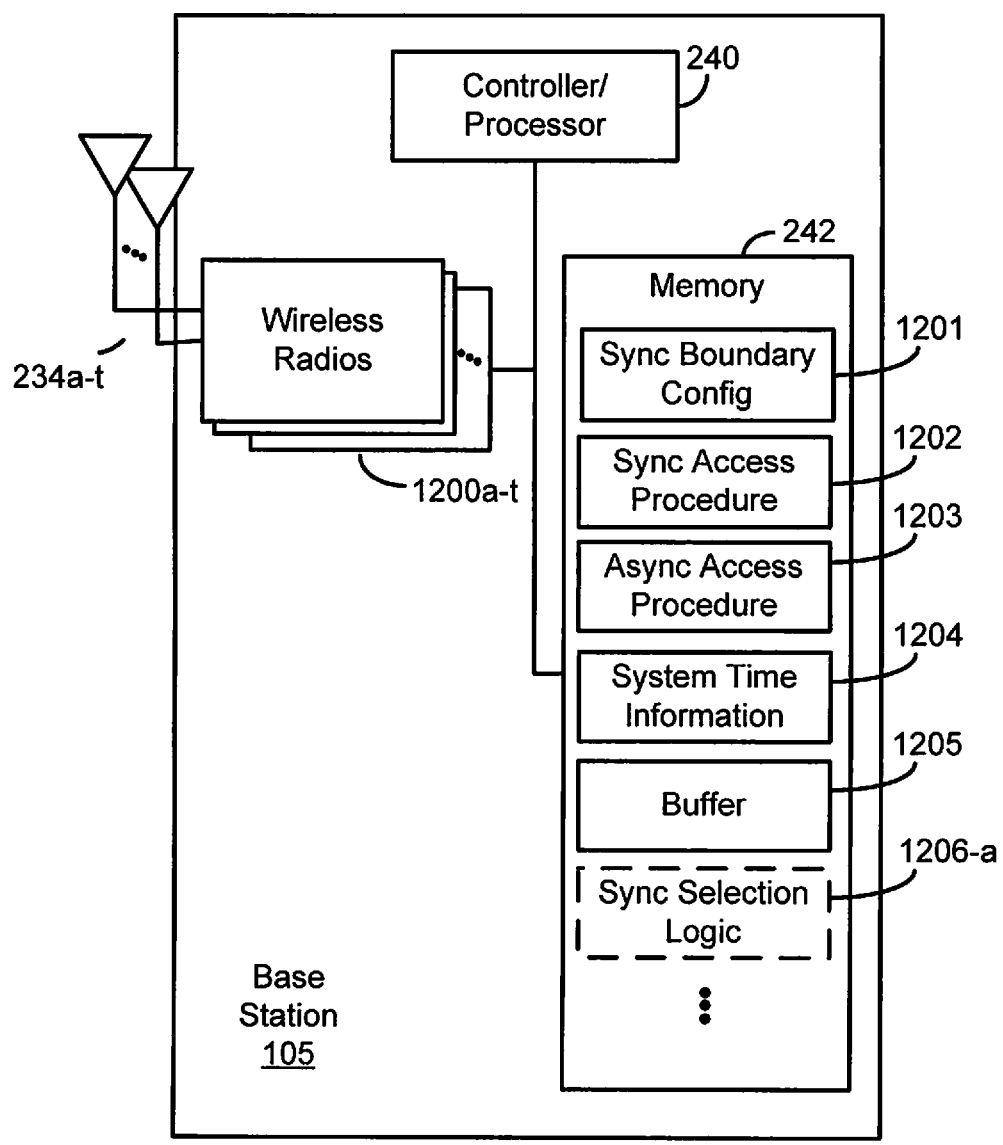
FIG. 12 is a block diagram illustrating an example base station configured according to one aspect of the present disclosure.

FIG. 5 is a block diagram illustrating example blocks executed to implement one aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1200a-t and antennas 234a-t. Wireless radios 1200a-t includes various components and hardware, as illustrated in FIG. 2 for base station 105, including modulator/demodulators 232a-t, MIMO detector 236, receive processor 238, transmit processor 220, and TX MIMO processor 230.

At block 500, a wireless node may obtain a synchronization boundary configuration for a shared communication channel, wherein the synchronization boundary configuration defines a synchronous contention window and periodicity for synchronous access contention by all accessing nodes of one or more radio access technologies. The synchronization boundary configuration sets the details for the size and frequency of the synchronous contention window. A wireless node, such as base station 105, may have this information predetermined in memory 242 at synchronization boundary configuration 1201 as a part of standard information pre-programmed into base station 105. In other example implementations, this configuration information may be received from a neighboring node in order to initiate the synchronous access contention operation. Such signals would be received at base station 105 via antennas 234a-t and wireless radios 1200a-t and stored at synchronization boundary configuration 1201 in memory 242.

At block 501, the wireless node identifies a next synchronous contention window according to the synchronization boundary configuration using an absolute system timing reference. Base station 105, under control of controller/processor 240 will use an absolute system time reference in order to identify the location of the next synchronous contention window according to the configuration information at synchronization boundary configuration 1201. Depending on the capabilities of base station 105, an absolute system timing reference may be autonomously generated and stored in memory 242 at system time information 1204. Alternatively, base station 105 may rely on external signals from other radio access networks for supplying the absolute system timing reference to store at system time information 1004. For example, if wireless radios 1200a-t include GPS radios, a GPS signal received over antennas 234a-t and so-equipped wireless radios 1200a-t may provide the absolute system timing reference. In alternative examples, if base station 105 does not have GPS radios or when the network information has provided for all nodes of any radio access technology attempting to access the shared communication channel to monitor for certain other radio access technology signals, such as certain WiFi beacon signals that include an absolute system timestamp, base station 105 would attempt to detect and decode such signal to obtain the absolute system timing reference.

At block 502, the wireless node initiates a synchronous contention procedure at the next synchronous contention window. When base station 105 identifies the next synchronous contention window, it, under control of controller/processor 240, may execute synchronous access procedure 1202. The execution environment of synchronous access procedure provides the functionality for base station 105 to compete with other nodes attempting to access the shared communication channel at the synchronous contention window. It also uses the periodicity information to provide switching to the synchronous procedure for each synchronous contention window.

At block 503, the wireless node conducts transmissions according to a result of the synchronous contention procedure. Depending on the result of the synchronous contention procedure, base station 105 may either transmit data via wireless radios 1200a-t and antennas 234a-t, or backoff if it detects another node that wins access, or where the priority scheme includes high priority nodes or high priority traffic, such as URLLC, base station 105 may attempt to find a different channel for transmissions.

At block 504, the wireless node performs asynchronous access contention for one or more asynchronous contention windows after the next synchronous contention window and prior to a subsequent synchronous contention window. After completion of the synchronous access contention operation, base station 105 may return to asynchronous access operations. Base station 105, under control of controller/processor 240, will execute asynchronous access procedure 1203, in memory 242. The execution environment of asynchronous access procedure 1203 provides base station 105 the functionality for identifying additional asynchronous contention windows and performing contention access procedures during those windows between each of the synchronous contention windows.

It should be noted that while the illustrated and described set of blocks executed with respect to FIG. 5 may provide for a mandatory, standardized performance of the described synchronous access contention, alternative aspects of the present disclosure may allowed for optional selection by a wireless node, such as base station 105, of the synchronous access contention. For example, after obtaining the synchronization boundary configuration in block 500, an alternative aspect of the present disclosure provides for a determination, at block 505-a, of whether a wireless node selects to comply with the functionality of the synchronous access contention. Base station 105, under control of controller/processor 204, executes alternative, synchronous selection logic 1206-a. The execution environment of synchronous selection logic 1206-a determines whether a current communication state of base station 105. If, for instance, base station 105 has made at least a threshold maximum number attempts to access the shared communication channel that have failed due to contention with other wireless nodes, the functionality of synchronous selection logic 1206-a would prompt base station 105 to select to comply with the synchronous access contention functionality and proceed to block 501, as described above. Similarly, if base station 105 detects that buffer 1205 has at least a threshold amount of data for transmission, the functionality of synchronous selection logic 1206-a would also prompt base station 105 to select to comply the synchronous access contention functionality and, thus, also proceed to block 501. Additionally, within the synchronous configuration parameters stored in synchronizing boundary configuration 1201, nodes that select to comply with the synchronous contention access functionality may use different transmission access parameters that may be more favorable.

The transmission access parameters include parameters defining the length of the maximum channel occupancy time (MCOT), length of a backoff window, and the like. Thus, within the execution environment of synchronous selection logic 1206-a, base station 105 may also select to comply with the synchronous access contention functionality in order to benefit from better transmission parameters. In one example aspect, the MCOT provided for synchronous access may be defined as a multiple of the MCOT for asynchronous operation (e.g., 2× asynchronous MCOT, 3× asynchronous MCOT, etc.). Similarly, the backoff window may be reduced, which decreases the potential time it may take for base station 105 to access the shared communication channel. Therefore, by selecting to comply with the synchronous access functionality, base station 105 may improve its transmission characteristics.

However, within the execution environment of synchronous selection logic 1206-a, where using the synchronous contention functionality would not necessarily benefit the communications of base station 105, base station 105 would not select to comply with the synchronous access contention functionality and, therefore, proceed to block 504 to perform asynchronous access contention.

Figure 6A:
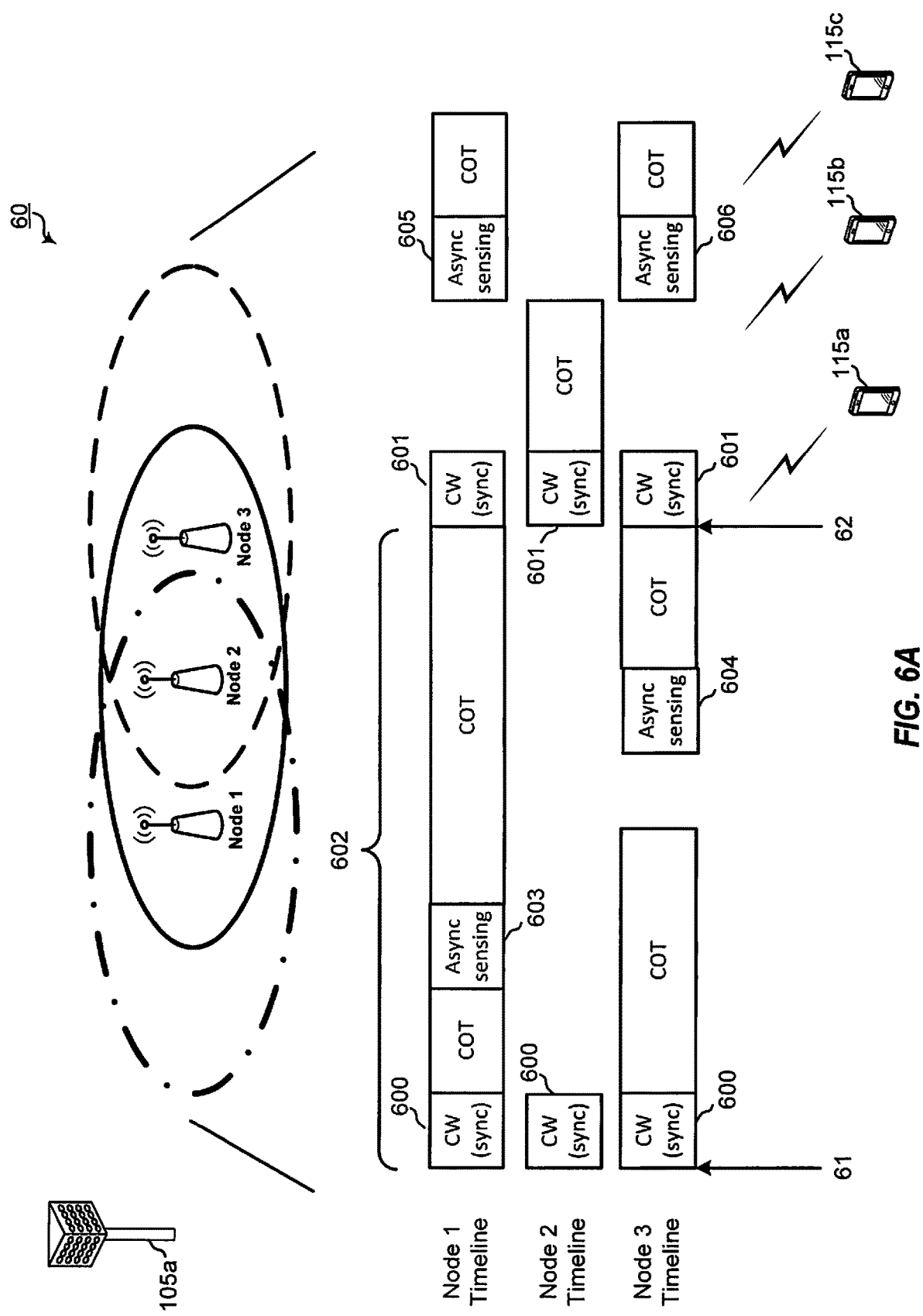
FIG. 6A is a block diagram illustrating an NR-U network having wireless nodes and UEs each configured according to one aspect of the present disclosure.

FIG. 6A is a block diagram illustrating NR-U network 60 having wireless nodes 1-3 and UEs 115a-c each configured according to one aspect of the present disclosure. As illustrated in FIG. 4, wireless nodes 1-3 have overlapping coverage areas in which the coverage area of wireless node 2 is completely overlapped by a portion of the coverage areas of nodes 1 and 3. According to the illustrated aspect of the present disclosure, the LBT procedure is modified to accommodate periodic synchronous access contention. Synchronization boundaries, such as sync boundaries 61 and 62, are defined, perhaps within Federal Communication Commission (FCC) regulations. The synchronous access contention at each of sync boundaries 61 and 62 include synchronous contention windows 600 and 601 at a periodicity 602. Periodicity 602 may be set for a variety of times as frequent as single maximum COT (MCOT) up to multiple MCOTs (e.g., 20 ms to 100 ms).

At synchronous contention window 600 each of wireless nodes 1-3 listens for any control signaling from other nodes prior to securing a COT for transmissions. After synchronous contention window 600, asynchronous access procedures may return, such as at asynchronous contention window 603 for wireless node 1 and asynchronous contention window 604 for wireless node 3. However, because overlapping, synchronous contention windows, such as synchronous contention windows 600 and 601 are configured, wireless node 2 may still realistically compete for access to the shared communication channel.

At synchronization boundaries 61 and 62, as defined by regulation, all transmitting devices conforming to the synchronous access procedure stop transmitting and restart channel access using the synchronous access procedure. For example, wireless node 3 secures a COT after successful contention at asynchronous contention window 604 and begins transmission within the COT. As synchronization boundary 62 approaches with synchronous contention window 601, wireless node 3 ceases transmissions and resets for synchronous access contention.

It should be noted that in additional aspects of the present disclosure the synchronous access contention operations may be limited to a certain node class. A node class may include different power classes or a deployment location of the node, such as indoors or outdoors. With reference to NR-U network 60, the illustrated aspect of the present disclosure identifies that low power outdoor nodes are subject to synchronous access contention. Therefore, nodes 1-3, which are classified as low power outdoor nodes are subject to the illustrated synchronous access procedures, while other node classes, such as base station 105a, as a high power outdoor node, are not subject to the synchronous access procedures.

The size of synchronous contention windows 600 and 601, as well as the length of periodicity 602 may be predefined by regulations, while the size of MCOTs need not change. As described, asynchronous access procedures would be allowed outside of synchronous contention windows 600 and 601. There would not be any other impact on the system behavior other than periodic transmission gaps and reset of the contention windows.

Figure 6B:
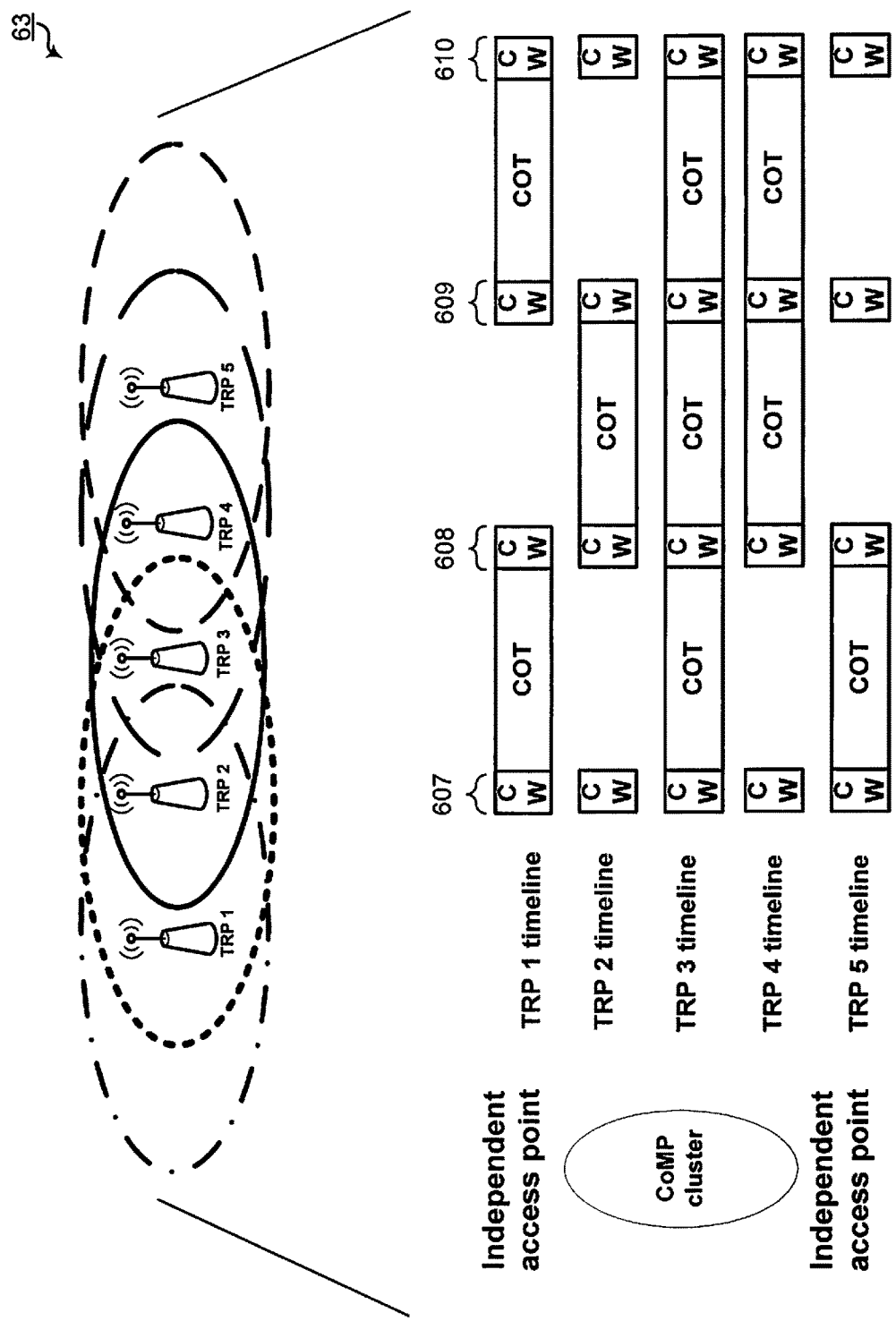
FIG. 6B is a block diagram illustrating an NR-U network having TRPs configured according to one aspect of the present disclosure.

FIG. 6B is a block diagram illustrating NR-U network 63 having TRPs 1-5 configured according to one aspect of the present disclosure. TRPs 1-5 are located such that a portion of each coverage area of the respective TRP is overlapped by the coverage area of another one or more TRPs. As illustrated TRPs 2-4 operate as a CoMP cluster, while TRPs 1 and 5 remain independent access points. Without the synchronizing contention of the various aspects of the present disclosure, the overlapping coverage areas and transmissions of the independent access point could effectively block the operations of various of the CoMP set TRPs, thus, significantly reducing the possibility of achieving beneficial CoMP results. However, according to the illustrated aspect of the present disclosure, each of TRPs 1-5 is subject to synchronous access contention operations. Synchronous contention windows 607-610 overlap for each of TRPs 1-5. Accordingly, each of the cluster members, TRPs 2-4, and the independent access points, TRPs 1 and 5, will have equal access in contending for the shared communication channel. The synchronizing of the access contention across all of TRPs 1-5 increases the probability to achieve the beneficial performance of the CoMP operations.

Figure 7:
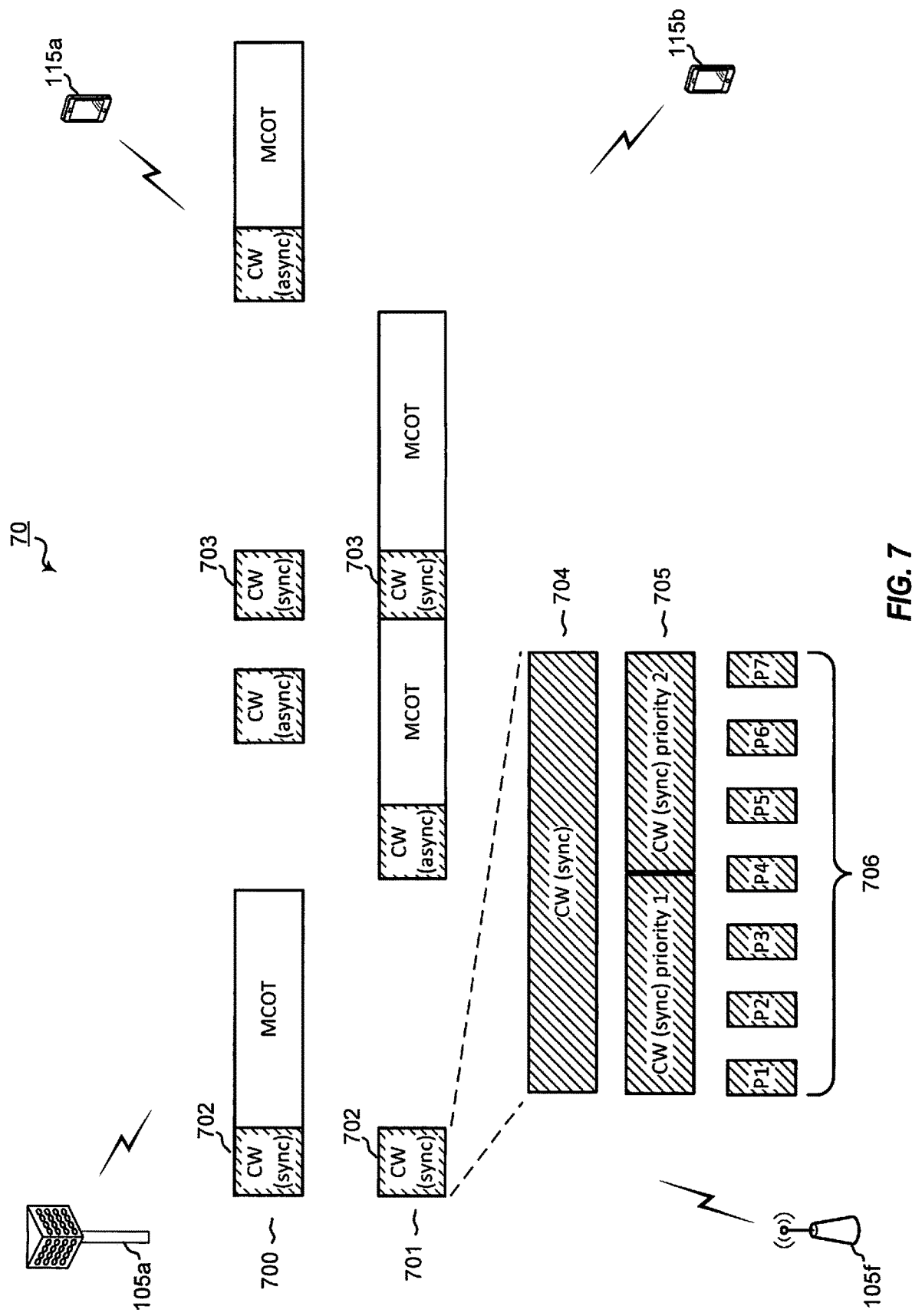
FIG. 7 is a block diagram illustrating an NR-U network having base stations and UEs each configured according to one aspect of the present disclosure.

FIG. 7 is a block diagram illustrating NR-U network 70 having base stations 105a and 105f and UEs 115a and 115b each configured according to one aspect of the present disclosure. In the illustrated aspect, synchronous access contention is applicable to all classes of nodes, such that base station 105a and 105f each contend for access to the shared communication channel at synchronous contention windows 702 and 703, while returning to asynchronous access procedures between the synchronizing boundaries. During synchronous contention windows 702 and 703, access can be prioritized among different nodes or different classes of traffic. In a first optional aspect, no priority is used for contention. Thus, within synchronous contention windows 702 and 703, all nodes contend 704 for access without priority. In a second optional aspect, a fixed priority scheme may be used in which a first set of nodes or an identified traffic type (e.g., URLLC traffic) may be assigned fixed priority to the shared communication channel. Thus, fixed priority scheme 705 will allow the high priority node (e.g., URLLC traffic, fixed priority node) to always access or reserve the medium at the beginning of the slot. The high priority node will not be subject to back off or delay, as, in fixed priority scheme 705, it can always be the highest priority, priority 1. Other traffic, priority 2 nodes, will not contend against the high priority node. When the priority 2 nodes detect such priority 1 nodes, the priority 2 node may back off, or, where priority 1 nodes identify URLLC traffic, the priority 2 node may attempt access to another shared communication channel. Further enhancements to quality of service (QoS) control may be possible and not limited to URLLC traffic only.

Previously described aspects of the present disclosure provide for a synchronous access contention based on standards which the wireless node is predetermined for the synchronous procedure. The node may determine the location of the synchronization boundary using the predetermined synchronizing boundary configuration and an absolute system timing reference. The absolute system timing reference may be autonomously generated or may be obtained via external signals, whether over-the-air (OTA) signals from other nodes of the same radio access technology, or by receiving other radio access technology signals at the wireless node (e.g., global positioning system (GPS) signals), or detecting other radio access technology signals (e.g., monitoring for certain WiFi beacon signals that include an absolute timestamp). Additional aspects of the present disclosure may trigger the synchronized contention based on signals received from an initiating device (e.g., an access point).

For some wireless nodes without the ability to autonomously maintain synchronization, coexistence requirements may provide for OTA signaling support within its own radio access technology to receive synchronization information, such as the absolute system timing reference and synchronous contention information from the initiating device. It would be up to the transmitting device to utilize a corresponding waveform used by the receiving device. Such coexistence requirements may be applicable for all nodes (indoor or outdoor) and power classes or for particular node classes, such as outdoor only or outdoor standard power only indoor low power only, and the like. Low power nodes may benefit from the synchronous alignment of the contention windows. By using the absolute system timing reference, a scenario where multiple nodes request disjoint synchronization points.

Figure 8:
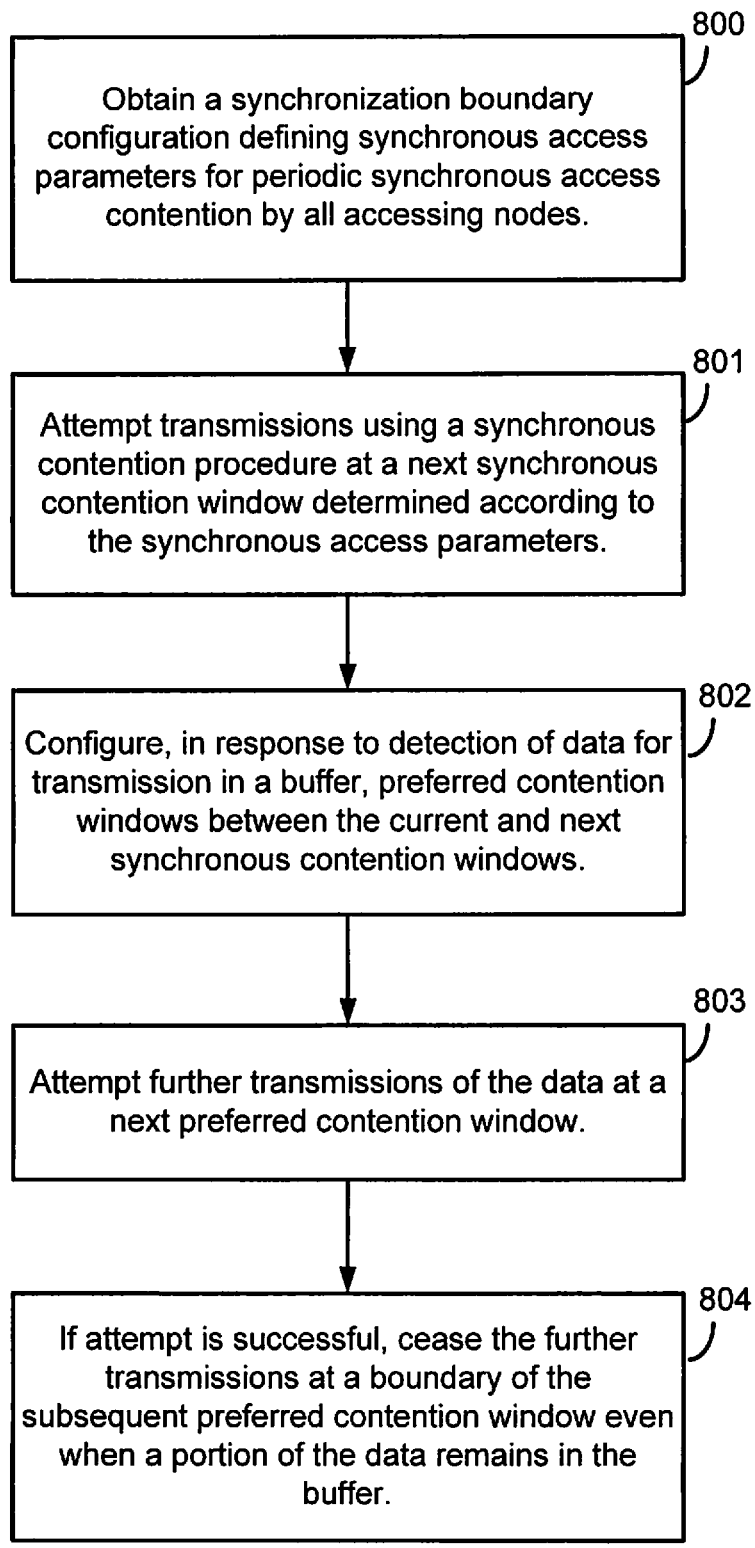
FIG. 8 is a block diagram illustrating example blocks executed to implement one aspect of the present disclosure.

FIG. 8 is a block diagram illustrating example blocks executed to implement one aspect of the present disclosure. The example blocks will also be described with respect to base station 105 as illustrated in FIG. 12.

At block 800, a wireless nodes obtains a synchronization boundary configuration for a shared communication channel, wherein the synchronization boundary configuration defines synchronous access parameters for periodic synchronous access contention by all accessing nodes of one or more radio access technologies. The synchronization boundary configuration sets the details for the size and frequency of the synchronous contention window. A wireless node, such as base station 105, may have this information predetermined in memory 242 at synchronization boundary configuration 1201 as a part of standard information pre-programmed into base station 105. In other example implementations, this configuration information may be received from a neighboring node in order to initiate the synchronous access contention operation. Such signals would be received at base station 105 via antennas 234*a-t* and wireless radios 1200*a-t* and stored at synchronization boundary configuration 1201 in memory 242.

At block 801, the wireless node attempts transmissions on the shared communication channel using a synchronous contention procedure at a next synchronous contention window determined according to the synchronous access parameters. Base station 105, under control of controller/processor 240, will use an absolute system time reference in order to identify the location of the next synchronous contention window according to the configuration information at synchronization boundary configuration 1201. Depending on the capabilities of base station 105, an absolute system timing reference may be obtained by various means, as noted above. When base station 105 identifies the next synchronous contention window, it, under control of controller/processor 240, may execute synchronous access procedure 1202. The execution environment of synchronous access procedure 1202 provides the functionality for base station 105 to compete with other nodes attempting to access the shared communication channel at the synchronous contention window. It also uses periodicity information from the synchronous access parameters to provide switching to the synchronous procedure for each synchronous contention window.

At block 802, the wireless node configures, in response to detection of data for transmission in a buffer of the wireless node, one or more preferred contention windows between the next synchronous contention window and the subsequent synchronous contention window. The synchronous access parameters in synchronous boundary configuration 1201 includes configuration of a number of preferred contention windows located between successive synchronous contention windows at a predefined periodicity of one MCOT. Base station 105 may use this information to configure the preferred contention windows upon detecting data remaining for transmission in buffer 1205.

At block 803, the wireless node attempts access of the shared communication channel for further transmissions of the data at a next preferred contention window of the one or more preferred contention windows. When extended due to buffer 1205 having data for transmission, base station 105 may, within the execution environment of synchronous contention procedure 1202, attempt access to the shared communication channel at a next one of these preferred contention windows.

At block 804, if the wireless node has gained access and is transmitting the data, the wireless node then ceases the further transmissions at a boundary of a subsequent preferred contention window of the one or more preferred contention windows when a portion of the data remains in the buffer. If the contention procedure is successful, base station 105, may transmit the data in buffer 1205 via wireless radios 1200*a-t* and antennas 234*a-t*. Base station 105 may continue such transmissions until the boundary of the next preferred contention window. Base station 105 would be required to stop transmitting at the next preferred contention window even if data remains in buffer 1205. If data remains in buffer 1205 at the next preferred contention window, after stopping transmission, base station 105 may again synchronously contend for access to the shared communication channel at the next preferred contention window.

In an alternative aspect according to FIG. 8, the wireless node may cease the further transmissions simply by using an enhanced COT (eCOT). The eCOT is defined to include both the amount of time used by the node to gain access to the channel in addition to the actual transmission time. By modifying the definition of a COT in this manner, the node does not have to keep track of the beginning of the next preferred contention window in order to cease any ongoing transmissions. Instead, the defined COT includes the access time, thus, the scheduled transmission within the eCOT will automatically cease at the end of the eCOT.

It should be noted that alternative aspects of the present disclosure may apply the definition of the eCOT to any node, whether the node is complying with the synchronous access functionality or not. By scheduling eCOT, both synchronous and asynchronous nodes may, in effect, achieve synchronous access contention windows, until the amount of data for transmission causes the transmission cease prior to the standard eCOT.

Figure 9:
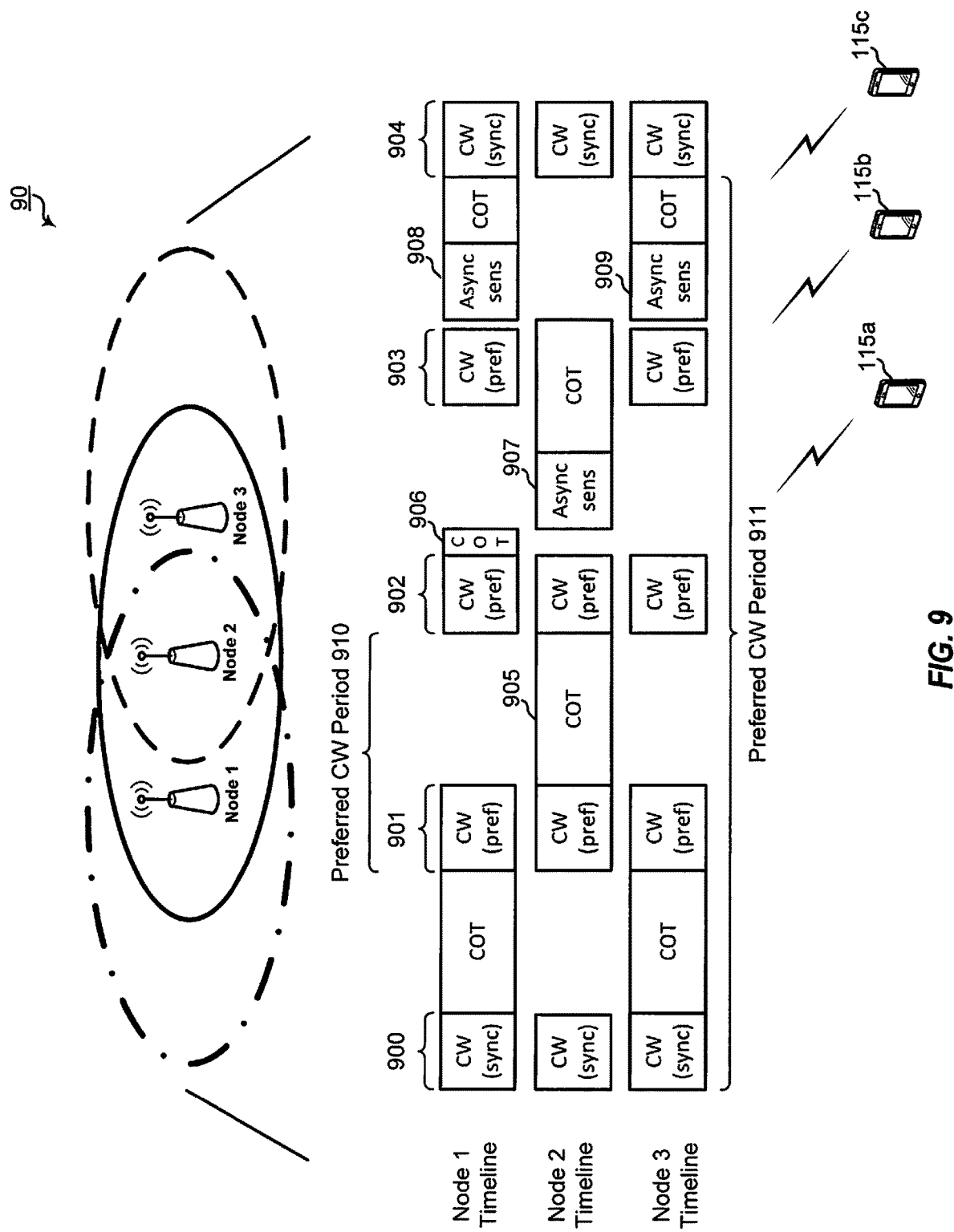
FIG. 9 is a block diagram illustrating an NR-U network having wireless nodes and UEs each configured according to one aspect of the present disclosure.

FIG. 9 is a block diagram illustrating NR-U network 80 having wireless nodes 1-3 and UEs 115*a-c* each configured according to one aspect of the present disclosure. As illustrated in FIG. 9, wireless nodes 1-3 have overlapping coverage areas in which the coverage area of wireless node 2 is completely overlapped by a portion of the coverage areas of nodes 1 and 3. According to the illustrated aspect of the present disclosure, the LBT procedure is modified to implement synchronous access contention. In addition to accommodating periodic synchronous access contention, as illustrated and described with respect to FIG. 6A, additional aspects of the present disclosure allow for maintaining the synchronous access contention in situations where full buffer traffic is experienced.

When buffer traffic is detected (e.g., data for transmission in the node's buffer), synchronization of access contention may be extended. Upon detection of such buffer traffic, nodes 1-3 may obtain the location information of additional contention windows in between synchronous contention windows 900 and 904. This information would be pre-defined according to standards and obtained along with the synchronizing boundary information in the synchronous access parameters of the synchronizing border configuration. Multiple "preferred" contention windows 901-903 would be defined in between synchronous contention windows 900 and 904 when synchronous access periodicity 911 between synchronous contention windows 900 and 904 is a multiple of the MCOT. Additionally, periodicity 910 of preferred contention windows 901-903 may be defined as equal to an MCOT. For any node that obtains access to the shared communication channel during one of preferred contention windows 901-903, transmissions will be required to stop at the boundary of the next preferred contention window, regardless of whether data remains in the buffer. If not enough data exists in the buffer to transmit to the boundary of the next preferred contention window, the node may stop transmitting when the data runs out. However, if data remains at the boundary of the next preferred contention window, the node must cease transmissions. For example, as illustrated in FIG. 9, node 2 wins access to the shared communication channel at preferred contention window 901 and begins transmissions at COT 905. At the beginning of the next MCOT and, thus, at the boundary of preferred contention window 902, node 2 must stop transmitting and contend again for access with nodes 1 and 3 at preferred contention window 902 when data remains in the buffer of node 2.

Asynchronous access points may still be allowed during an extended synchronous access contention period. For example, when a small amount of data for transmission results in a short COT, such as COT 906, or no access results after a preferred contention window, such as preferred contention window 903, nodes 1-3 may contend for access at asynchronous points, such as asynchronous sensing occasions 907-909. When accessing the shared communication channel from one of asynchronous sensing occasions 907-909, such as at asynchronous sensing occasion 907 by node 2, node 2 would not be required to cease transmissions at the boundary of the next preferred synchronous contention window, preferred contention window 903.

It should be noted that the maximum channel occupancy may be effectively reduced by the time it takes to contend for and access the medium during these preferred contention windows, but alignment of preferred contention windows 901-903 can be maintained under the full buffer scenario.

Figure 13:
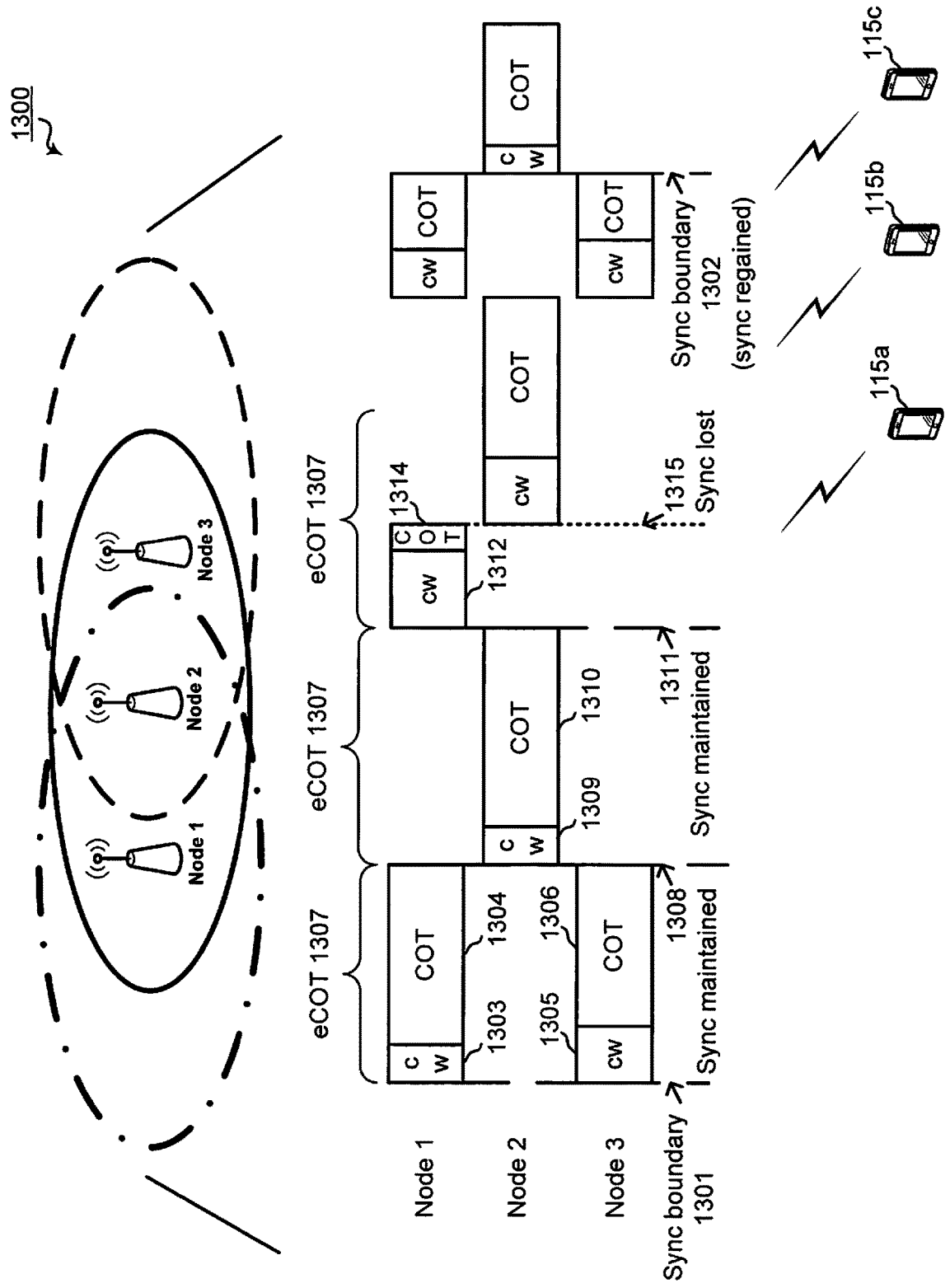
FIG. 13 is a block diagram illustrating a NR-U network having wireless nodes and UEs each configured according to one aspect of the present disclosure.

FIG. 13 is a block diagram illustrating NR-U network 1300 having wireless nodes 1-3 and UEs 115a-c each configured according to one aspect of the present disclosure. As illustrated in FIG. 13, wireless nodes 1-3 have overlapping coverage areas in which the coverage area of wireless node 2 is completely overlapped by a portion of the coverage areas of nodes 1 and 3. According to the illustrated aspect, instead of the node ceasing ongoing transmissions at the next preferred contention window, eCOT are used, which schedules a full transmission according to an eCOT equal to a standardized constant time, T.

In case of the full buffer traffic as noted above, preferred contention windows can be maintained. Wireless nodes may compute the eCOT in such a way that the time it takes to access the shared communication channel (e.g., the contention window) plus the actual transmission time is equal to a predefined, standardized constant time, T. Synchronization of such nodes using eCOT scheduling would be maintained even if preferential treatment is given to some synchronized nodes that utilize constant time nT, where n is an integer (e.g., n=2). There would not be any other impact on the system behavior other than the transmission stops and reset of the contention windows at the synchronization boundaries.

Thus, at synchronizing boundary 1301, nodes 1-3 have synchronized contention windows 1303 and 1305. Because nodes 1 and 3 have coverage areas that do not overlap, both nodes 1 and 3 may secure access to the shared communication channel and transmit during COT 1304 and COT 1306, respectively, for the predetermined constant of time, T, defining the length of eCOT 1307. Node 2, however, does not gain access. In detecting buffer data, preferred contention windows may be defined by eCOT 1307. At 1308, synchronization is maintained, as nodes 1 and 3 transmit for the full eCOT 1307. Node 2 successfully accesses the channel at preferred contention window 1309 and transmits in COT 1310 for the combined duration of eCOT 1307. Therefore, at 1311, synchronization is still maintained.

After winning access to the shared channel after 1311, node 1 only transmits the duration of COT 1314, which is a combined length less than eCOT 1307. At 1315, therefore, synchronization is lost. Any further access to the shared channel by any of nodes 1-3 would then be out of synchronization until the next boundary at synchronous boundary 1302.

Figure 10:
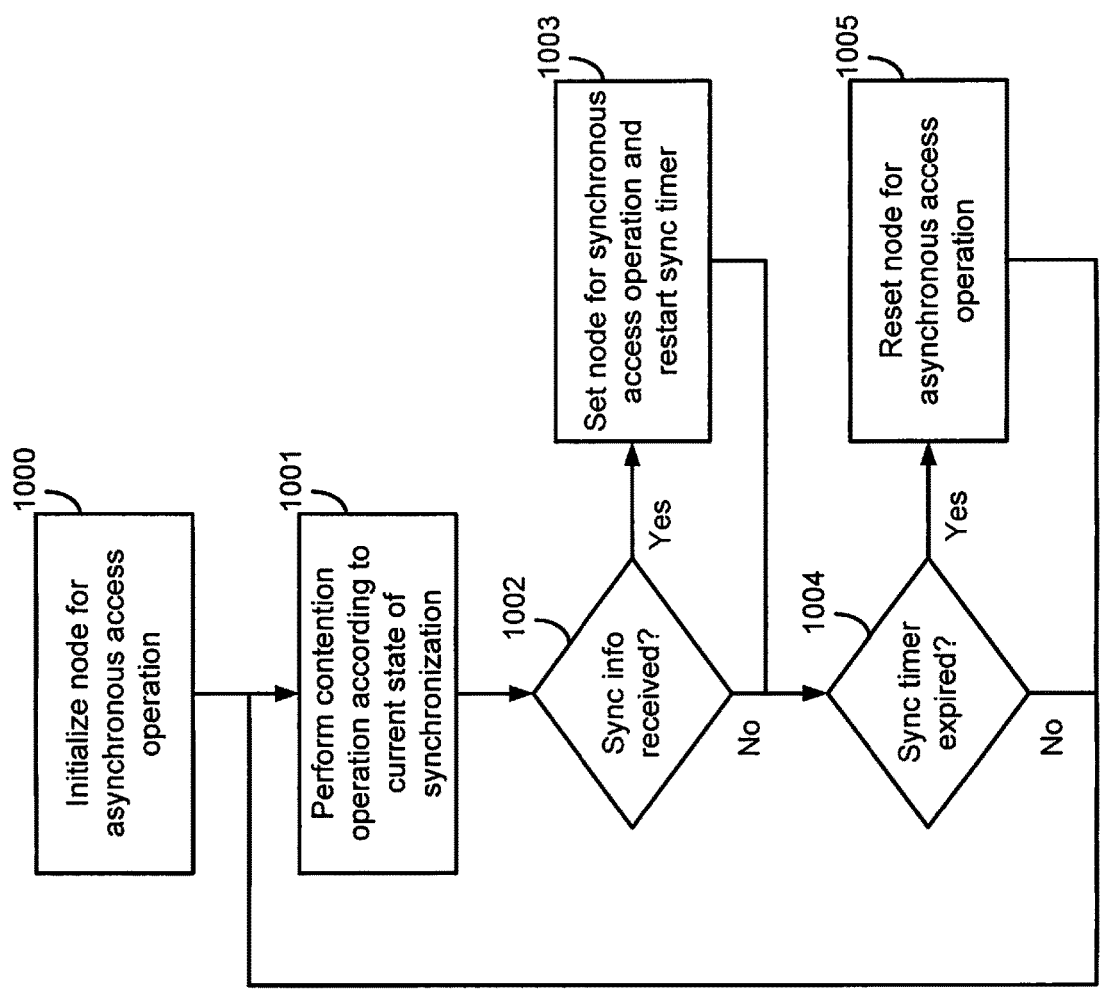
FIG. 10 is a block diagram illustrating example blocks executed to implement one aspect of the present disclosure.

FIG. 10 is a block diagram illustrating example blocks executed to implement one aspect of the present disclosure. At block 1000, a node is initialized for asynchronous access operations. At block 1001, the node performs contention operations according to a current state of synchronization. At block 1002, a determination is made whether synchronization information has been received. If so, then, at block 1003, the node is set for synchronous access operations and the synchronization timer is restarted. If synchronization information was not received or after setting the node for synchronous access operations, another determination is made, at block 1004, to determine whether the synchronization timer has expired. If so, the node is reset for asynchronous access operations. If the synchronization timer has not expired or after resetting the node for asynchronous access operations, the nodes returns to perform contention operations at block 1001 according to the current state of synchronization. This current state will be either the asynchronous access operation or the synchronous access operation according to the receipt of the synchronization information and/or status of the synchronization timer.

As referenced above, existing messages defined in various radio access technologies, such as WiFi, can be enhanced in a relatively straightforward way to convey timing information. For example, WiFi beacon signals according to IEEE 802.11 contain a timestamp. This beacon signal may then be used to deliver the absolute system timing reference information for the purposes of identifying the synchronizing boundaries for synchronous access contention. Different values could be reserved to indicate a certain synchronous contention window reference point and otherwise have no other impact on behavior. For such delivery mechanism to work, all access points or wireless nodes would monitor for the message or beacon signal that conveys such absolute timing information.

The FCC defines synchronization boundaries for synchronized contention. Such synchronization boundaries may be referred to as a time domain raster, where all conforming nodes with ongoing transmissions may be required to stop transmitting and restart using synchronous contention. In one example implementation, standard power, outdoor access points may be required to conform to the time domain raster (e.g., the synchronous accession contention) if there is no OTA signaling support within its own radio access technology to receive the timing information. These devices may already have a GPS receiver in order to determine their location for the purposes of coexistence with primary 6 GHz or UNII-7 band users. Otherwise, access points may be required to conform to the synchronous access contention only if the synchronization information is available through OTA signaling within their own technology.

Figure 11:
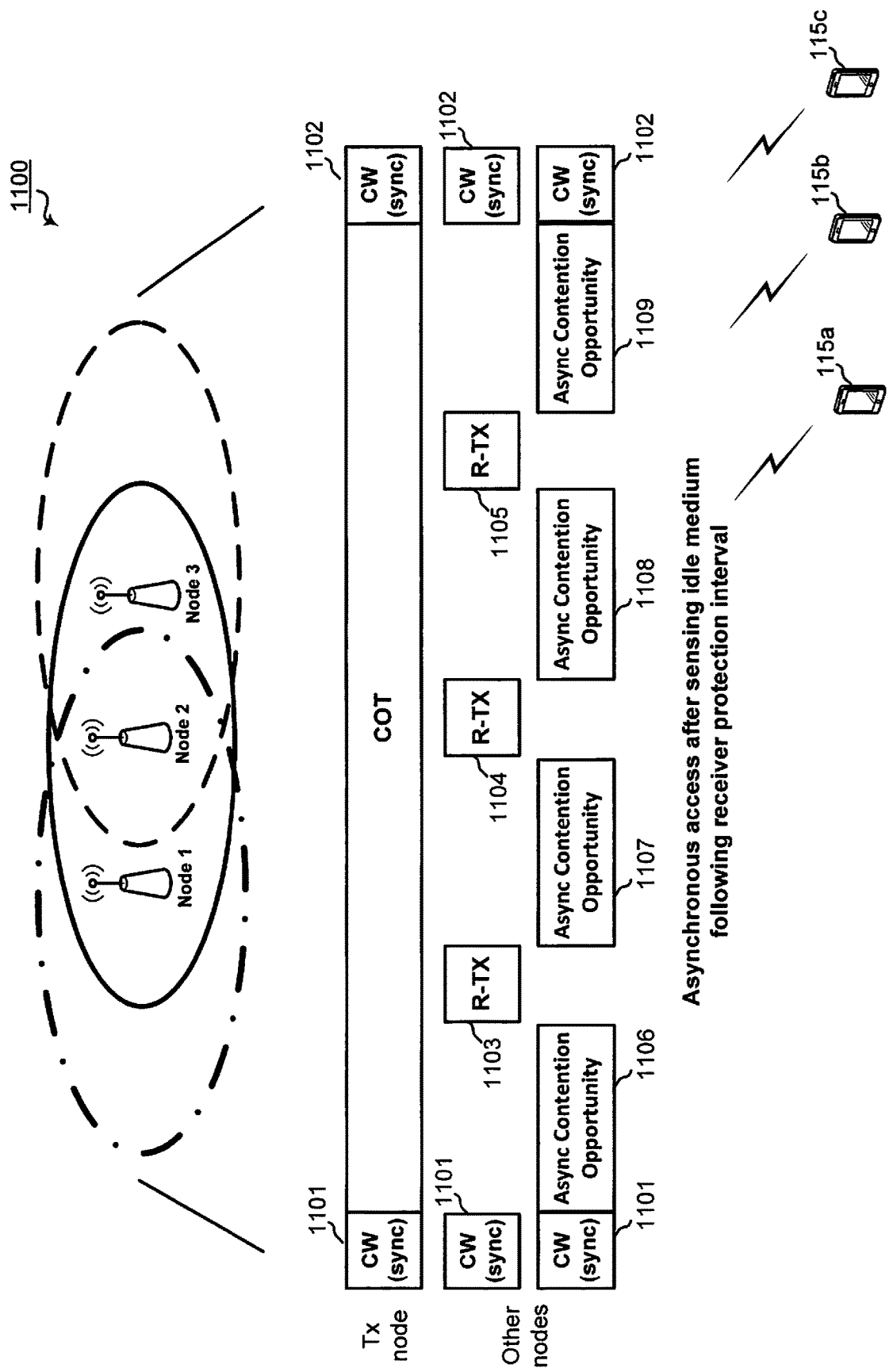
FIG. 11 is a block diagram illustrating a NR-U network having wireless nodes and UEs each configured according to one aspect of the present disclosure.

FIG. 11 is a block diagram illustrating NR-U network 1100 having wireless nodes 1-3 and UEs 115a-c each configured according to one aspect of the present disclosure. As illustrated in FIG. 4, wireless nodes 1-3 have overlapping coverage areas in which the coverage area of wireless node 2 is completely overlapped by a portion of the coverage areas of nodes 1 and 3. According to the illustrated aspect, technology neutral receiver protection mechanism may be defined in a relatively straightforward manner by utilizing the concept of receiver signaling during predefined intervals determined relative to the synchronization boundary. A node that wins contention, such as node 1, at synchronous contention window 1100 may use synchronous contention window 1100 for receiver protection signaling. As indicated above, receiver protection signaling may be analogous to CTS signaling, in which the intended receiving node transmits the CTS to indicate that it will be expecting to receive transmitted signals. Surrounding nodes which monitor for and detect such receiver protection signals may schedule or coordinate their own transmissions to minimize interference with the receiver.

In order to improve the granularity of receiver protection, additional receiver protection intervals, R-TX 1102-1104, can be defined sufficient to convey receiver feedback, e.g., ~50-100 μs) in between synchronous contention windows 1100 and 1101. Receiver protection signals may then be transmitted during such receiver protection intervals, R-TX 1102-1104. Between synchronous contention windows 1100 and 1101 and between the additional receiver protection intervals, R-TX 1102-1104, node 3 may have asynchronous access opportunities at asynchronous contention opportunity windows 1105-1108. Thus, a technology neutral mechanism is implemented for receiver protection between synchronous contention windows 1100 and 1101.

Figure 14:
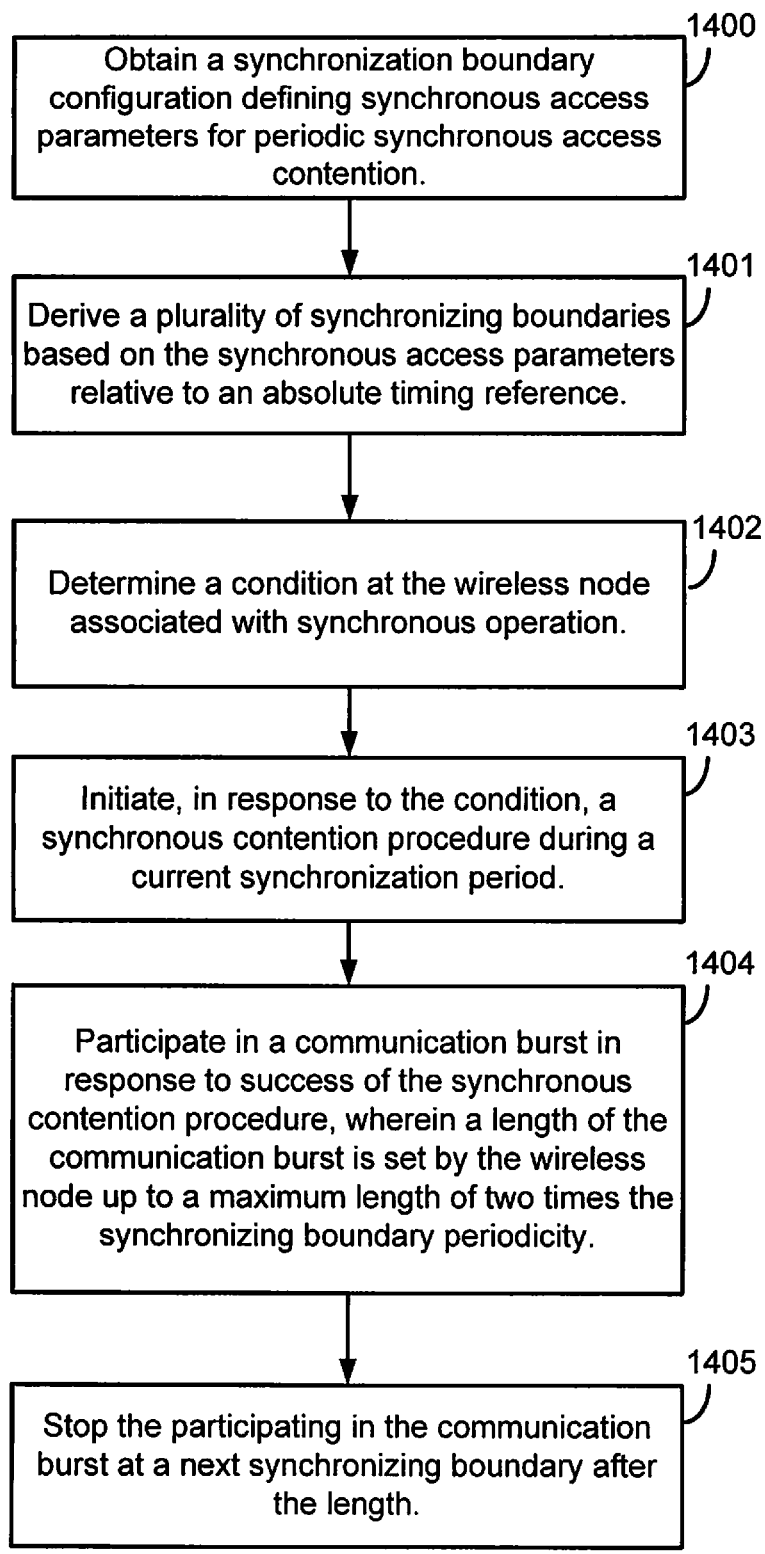
FIG. 14 is a block diagram illustrating example blocks executed to implement one aspect of the present disclosure.

FIG. 14 is a block diagram illustrating example blocks executed to implement one aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1200*a-t* and antennas 234*a-t*. Wireless radios 1200*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 1400, a wireless node obtains a synchronization boundary configuration for a shared communication channel, wherein the synchronization boundary configuration defines synchronous access parameters for periodic synchronous access contention by all accessing nodes of one or more radio access technologies. The synchronization boundary configuration include synchronous access parameters that set the details for the location and frequency of the synchronous contention window. A wireless node, such as base station 105, may have this information predetermined in memory 242 at synchronization boundary configuration 1201 as a part of standard information pre-programmed into base station 105.

At block 1401, the wireless node derives a plurality of synchronizing boundaries based on the synchronous access parameters relative to an absolute timing reference, wherein the synchronous access parameters include a synchronizing boundary location and a periodicity of the plurality of synchronizing boundaries. Base station 105, under control of controller/processor 242, may access system time information 1204, which provides an absolute timing reference for which base station 105 to derive the locations of the synchronizing boundaries using the synchronous access parameters from synchronization boundary configuration 1201.

At block 1402, the wireless node determines a condition at the wireless node associated with synchronous operation. Compatible wireless nodes may have capabilities to operating synchronously, via synchronous access procedure 1202, and asynchronously, via asynchronous access procedure 1203. During certain conditions, a wireless node may achieve improved access or performance by using synchronous transmission operations. Such conditions may include a substantial amount of data in buffer 1205, having high priority data traffic, detecting a crowded spectrum in which multiple different nodes are attempting to access the same shared communication channel, and a failure of channel access procedures that rises to a threshold level. When these and other similar conditions are detected at base station 105, base station 105, under control of controller/processor 240, may elect use synchronous access contention.

At block 1403, the wireless node initiates, in response to the condition, a synchronous contention procedure during a current synchronization period between a last prior synchronizing boundary and a next current synchronizing boundary at the end of the current synchronization period. When these and other similar conditions are detected at base station 105, base station 105, under control of controller/processor 240, may elect to execute synchronous access procedure 1202, in memory 242, according to the synchronous access parameters in synchronization boundary configuration 1201. The execution environment of synchronous access procedure 1202.

At block 1404, the wireless node participates in a communication burst in response to success of the synchronous contention procedure, wherein a length of the communication burst is set by the wireless node up to a maximum length of two times the periodicity. Upon detecting success in the contention operation, base station 105 may participate in a communication burst that may include base station 105 transmitting data from buffer 1204 via wireless radios 1200*a-t* and antennas 234*a-t*. The communication burst also includes the idle time during the contention window when base station 105 attempts access to the shared communication channel, as well as any time base station 105 receives transmissions from other nodes in communication with base station 105 and any switching time when transitioning between transmission and reception. According to the synchronous access parameters in synchronization boundary configuration 1201, base station 105 has the information to calculate the length of the communication burst to up to two full synchronization periods. According to certain aspects, base station 105 may be allowed a communication burst of up to the full two synchronization periods, while other selected aspects may limit the extended communication burst to a predefined percentage of the two synchronization periods.

At block 1405, the wireless node stops the participating in the communication burst at a next synchronizing boundary of a next synchronization period. When base station 105 reaches the next synchronizing boundary after the extended communication burst, it will stop transmissions for the next synchronized contention access period. Additional aspects of the present disclosure may define synchronizing super boundaries amount the other synchronizing boundaries defined by the synchronous access parameters of synchronization boundary configuration 1201. The synchronizing super boundaries occur at a super periodicity, which may be a constant multiple of the existing periodicity of the regular synchronizing boundaries. Any node, including base station 105, participating in synchronous operations will end all transmissions and communications bursts at a synchronizing super boundary regardless of any additional extended communication burst rules.

Figure 15:
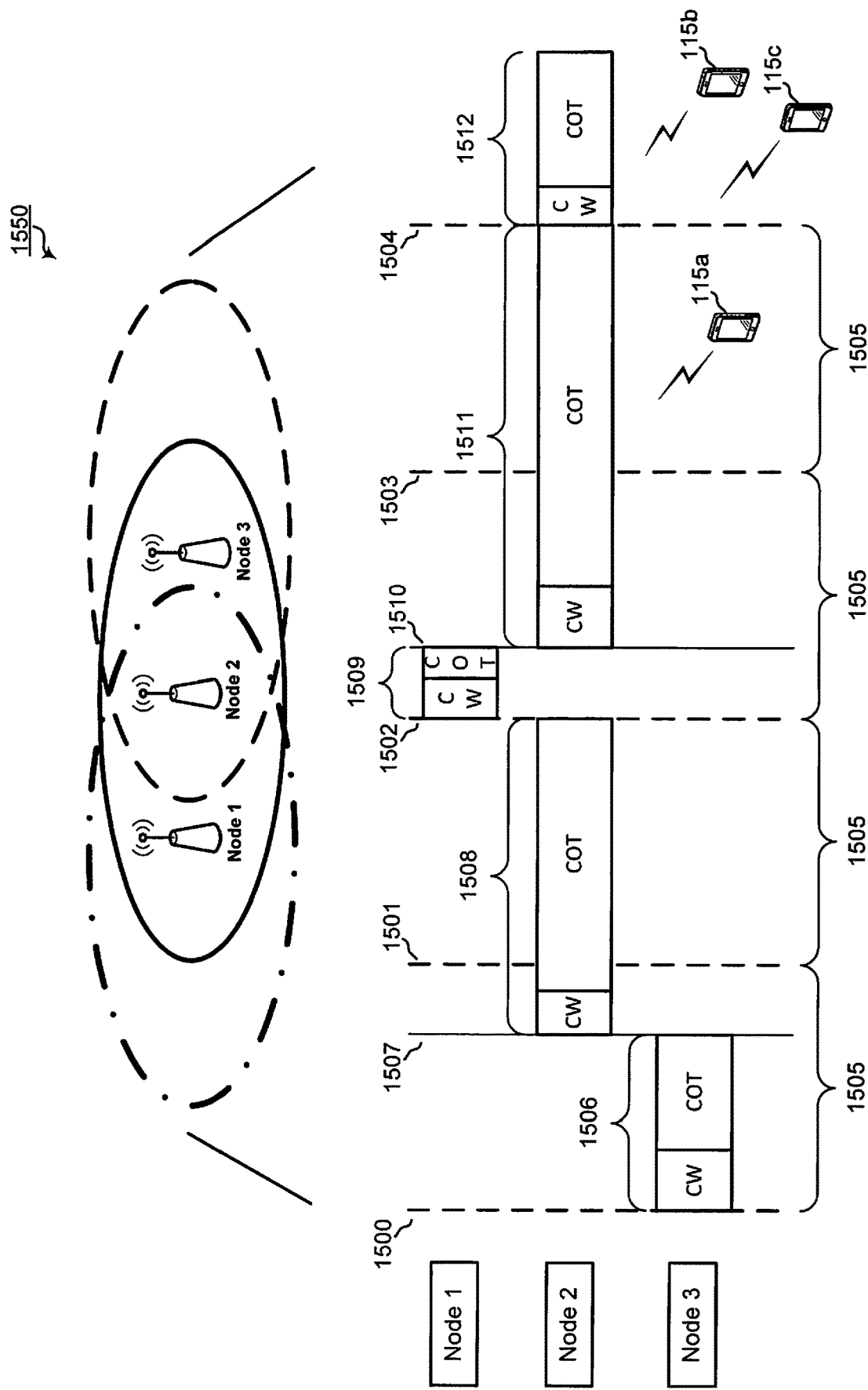
FIG. 15 is a block diagram illustrating a portion of an NR-U network having nodes configured according to one aspect of the present disclosure.

FIG. 15 is a block diagram illustrating a portion of an NR-U network 1550 having nodes 1-3 configured according to one aspect of the present disclosure. As illustrated, three wireless nodes, nodes 1-3, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. FIG. 15 further shows the illustrative timelines for each of nodes 1-3. In providing communications with UEs 115*a-c*, the medium access procedure for each node includes contention windows in which each node may contend for the shared communication channel.

In implementation of the various aspects of the present disclosure, periodic synchronization boundaries are defined by standards (e.g., FCC standards, etc.). Such nodes would have predefined configuration information for synchronization boundaries including the periodicity (e.g., 6 ms, 8 ms, etc.) defined relative to the Global Navigation Satellite System (GNSS) time. According to the illustrated aspect, a communication burst may be defined as the total transmission time of the master device and any associated slave devices including the gaps to switch transmission direction and the continuous idle time of the contention window sensed by the master device immediately prior to the beginning of the transmission. When not operating under synchronized transmission, each communications burst may not span more than one synchronization boundary. When a given node has sufficient data to be transmitted, a communication burst associated with such node may not be shorter than the synchronization boundary period unless the communication burst ends at the synchronization boundary, and if the communication burst begins at a synchronization boundary, the burst will end at the next synchronization boundary as long as there remains data in the buffer, in order to preserve and maintain synchronized traffic. However, when a node elects to perform transmission according to the synchronized transmission configuration, the synchronized node may maintain a communication burst for up to two synchronization boundary periods.

As illustrated in FIG. 15, node 2 has sufficient data to transmit according to the synchronized transmission configuration while nodes 1 and 3 are either not capable of synchronized transmission or do not have sufficient data for prolonged transmissions. Node 2, operating according to the synchronized transmission configuration, identifies synchronization boundaries 1500-1504 occurring at a periodicity 1505. At synchronization boundary 1500, node 3 has data and wins access to the shared communication channel with the contention window of communication burst 1506. Without enough data to continue transmitting to synchronization boundary 1501, node 3 ends communication burst 1506 at 1507. Node 2, operating according to the synchronizing configuration. obtains access to the share communication channel in the contention window of communication burst 1508. Because node 2 is operating synchronously, it knows the locations of synchronization boundaries 1500-1504, upon securing access to the shared communication channel at 1507, node 2 is allowed to exceed the single synchronization periodicity transmission limit and continue transmissions to the next synchronization boundary, synchronization boundary 1502, after a next full synchronization period. According to the illustrated aspect, node 2, when operating synchronously, may continue transmissions for up to two synchronization periods.

After node 2 stops transmissions at synchronization boundary 1502, node 1 successfully obtains access to the share communication channel for a short transmission, communication burst 1509, ending at 1510. Again, with sufficient data for transmission, node 2 regains access to the shared communication channel at 1510 for communication burst 1511 which extends for the majority of the duration of synchronization period 1505 between synchronization boundaries 1502 and 1503, and the full synchronization period 1505 between synchronization boundaries 1503 and 1504. By rule, node 2 stops transmission at synchronization boundary 1504, but, with still more data for transmission, contends for and obtains access to the shared communication channel for communication burst 1512. According to the illustrated aspect, synchronized transmissions are not mandated by the standards, but enabled and motivated through the ability of participating nodes to extend transmissions for longer than the standard limit of a single synchronization periodicity 1505.

Figure 16:
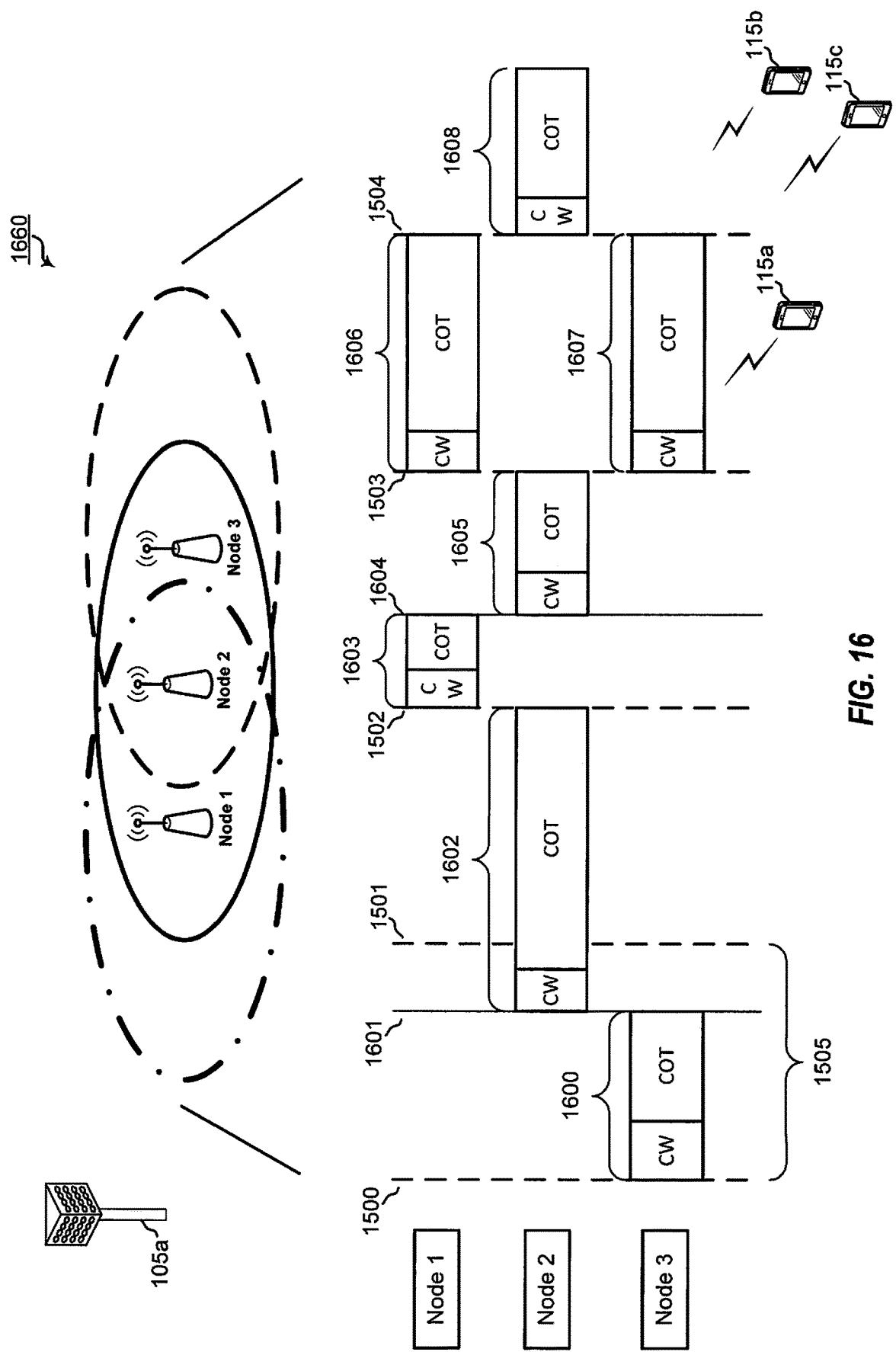
FIG. 16 is a block diagram illustrating a portion of an NR-U network having nodes configured according to one aspect of the present disclosure.

FIG. 16 is a block diagram illustrating a portion of an NR-U network 1660 having nodes 1-3 configured according to one aspect of the present disclosure. As in FIG. 15, three wireless nodes, nodes 1-3, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. Periodic synchronization boundaries 1500-1504 are defined by standards (e.g., FCC standards, etc.), in which nodes 1-3 would have the predefined configuration information, including the periodicity (e.g., 6 ms, 8 ms, etc.), defined relative to GNSS time.

Communication bursts may also be defined as the total transmission time of the master device and any associated slave devices including the gaps to switch transmission direction and the idle time of the contention windows immediately prior to the beginning of the transmission. As illustrated in FIG. 15, when not operating under synchronized transmission, each communications burst of FIG. 16 may not span more than one synchronization boundary, and when a given node has sufficient data to be transmitted, the communication burst associated with such node may not be shorter than the synchronization boundary period unless the communication burst ends at the synchronization boundary, and if it begins at the synchronization boundary the communication burst will end at the next synchronization boundary. However, when one of nodes 1-3 of FIG. 16 elects to perform transmission according to the synchronized transmission configuration, the synchronized node may maintain a communication burst for longer than a single synchronization period.

It should be noted that the length of the additional amount synchronous nodes are allowed to transmit may be predetermined according to the implemented standards (e.g., 125%, 150%, 175%, etc.) in order to affect motivation of a node to elect using synchronous transmission. For example, when set to 150%, the average communication burst length may equal to the synchronization boundary period (within defined tolerance) under random starting locations of the communication burst. Therefore, when set to 150% or less, there may be less motivation for nodes to select synchronous operations other than to achieve synchronous operation.

As illustrated in FIG. 16, node 2 has sufficient data to transmit according to the synchronized transmission configuration while nodes 1 and 3, as in FIG. 15, are either not capable of synchronized transmission or do not have sufficient data for prolonged transmissions. Node 2, operating according to the synchronized transmission configuration, identifies synchronization boundaries 1500-1504 occurring at a periodicity 1505. At synchronization boundary 1500, node 3 has data and wins access to the shared communication channel with the contention window of communication burst 1600. Without enough data to continue transmitting to synchronization boundary 1501, node 3 ends communication burst 1600 at 1601. Node 2, operating according to the synchronizing configuration, obtains access to the share communication channel in the contention window of communication burst 1602. Because node 2 is operating synchronously, it knows the locations of synchronization boundaries 1500-1504.

Upon securing access to the shared communication channel at 1601, node 2 is allowed to exceed the single synchronization periodicity transmission limit by the predetermined length and continue transmissions to the next synchronization boundary, synchronization boundary 1502, after a next full synchronization period. For purposes of the illustrated example, an excess length of 150% of periodicity 1505 is allowed for continued transmission. Node 2 determines, at 1601, that less than or equal to 150% of periodicity 1505 exists between 1601 and synchronization boundary 1502. Therefore, node 2 may continue transmissions of communication burst 1602 from 1601 to synchronization boundary 1502. At synchronization boundary 1502, node 1 secures access to the shared communication channel for communication burst 1603 that ends at 1604, shortly after synchronization boundary 1502. Node 2, again operating synchronously, regains access to the shared communication channel in the contention window after 1604 for communication burst 1605. However, when node 2 obtains access to the shared communication channel at 1604, it determines that the remaining time of the synchronization period between synchronization boundaries 1502 and 1503, plus the synchronization period between synchronization boundaries 1503 and 1504 is greater than 150% of periodicity 1505. Accordingly, node 2 is required under synchronous operation to stop transmitting communication burst 1605 at synchronization boundary 1503. As illustrated, nodes 1 and 3 each obtain access to the shared communication channel, at non-overlapping portions, for transmission of communication bursts 1606 and 1607 which are limited by standard, predetermined length of a single synchronization period. Node 2 may again obtain access to the shared channel at synchronization boundary 1504 for transmission of communication burst 1608.

Figure 17:
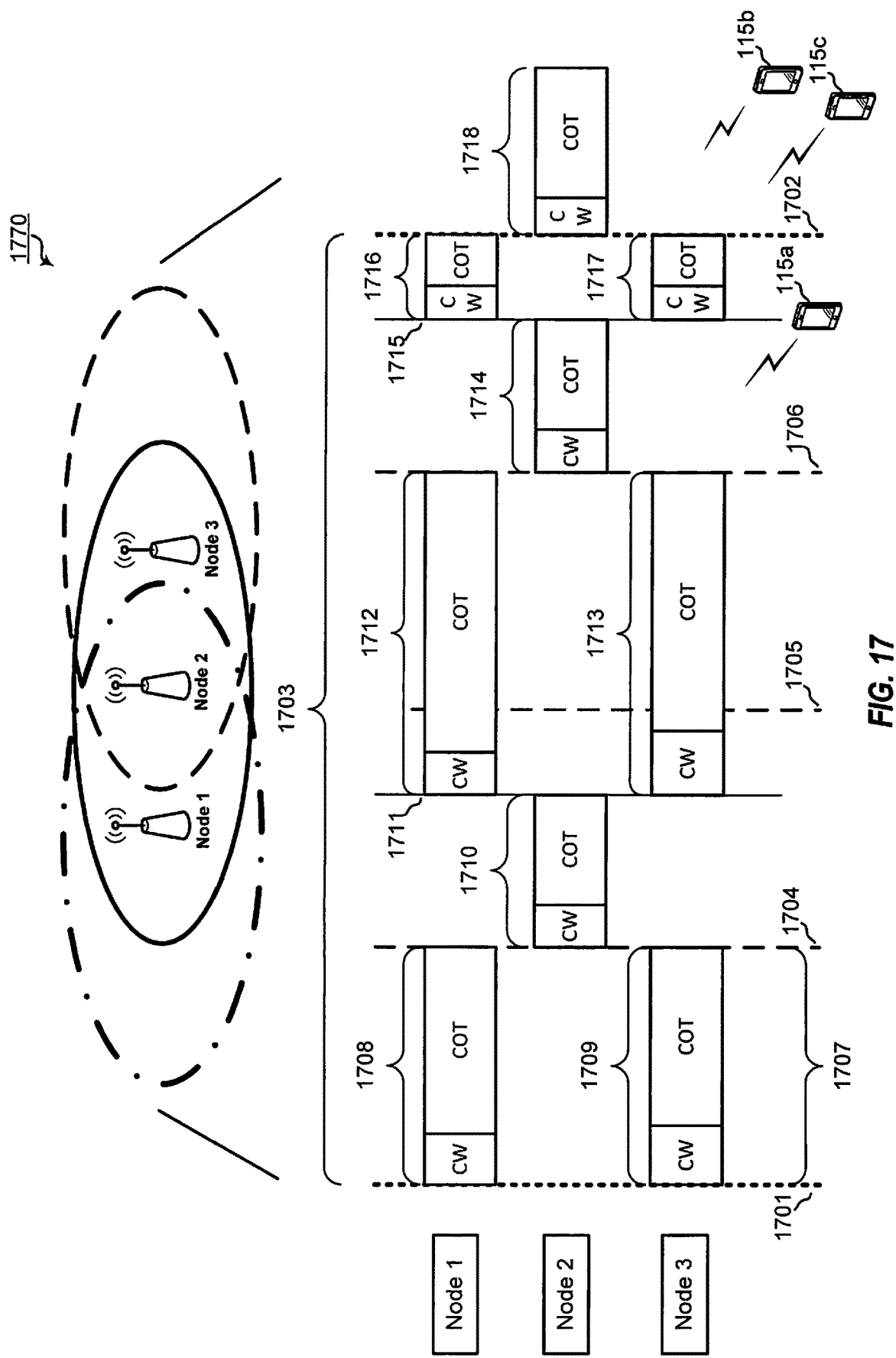
FIG. 17 is a block diagram illustrating a portion of an NR-U network having nodes configured according to one aspect of the present disclosure.

FIG. 17 is a block diagram illustrating a portion of an NR-U network 1770 having nodes 1-3 configured according to one aspect of the present disclosure. As in FIGS. 15 and 16, three wireless nodes, nodes 1-3, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. Periodic synchronization boundaries 1704-1706 and periodic synchronization super boundaries 1701 and 1702 are defined by standards (e.g., FCC standards, etc.), in which nodes 1-3 would have the predefined configuration information, including periodicity 1707 (e.g., 6 ms, 8 ms, etc.), between synchronization boundaries 1704-1706 and a super periodicity 1703 of synchronization super boundaries 1701-1702, which may by defined as a number, n, of synchronization boundaries (e.g., n=5, 10, etc.), each defined relative to GNSS time.

As illustrated and described with respect to FIGS. 15 and 16, communication bursts in the aspect illustrated in FIG. 17 may also be defined as the total transmission time of the master device and any associated slave devices including the gaps to switch transmission direction and the idle time of the contention windows immediately prior to the beginning of the transmission. Moreover, when not operating under synchronized transmission, each communications burst of FIG. 17 may not span more than one synchronization boundary, and when a given node has sufficient data to be transmitted, the communication burst associated with such node may not be shorter than the synchronization boundary period unless the communication burst ends at the synchronization boundary, and if it begins at the synchronization boundary the communication burst will end at the next synchronization boundary. When one of nodes 1-3 of FIG. 17 elects to perform transmission according to the synchronized transmission configuration, the synchronized node may maintain a communication burst for longer than a single synchronization period (e.g., 125%, 150%, 175%, etc.). However, any of nodes 1-3 operating synchronously may not continue transmissions over one of synchronization super boundaries 1701 and 1702.

According to the illustrated example implementation of FIG. 17, nodes 1 and 3 each have sufficient data for electing synchronous operations, while node 2 may either not elect synchronous operation or may have limited data that is insufficient for continued transmissions over at least a full synchronization period. At synchronization super boundary 1701, nodes 1 and 3 obtain access to the shared communication channel for transmission of communication bursts 1708 and 1709, respectively. Because of the limitation set by the predetermined excess length (125%, 150%, 175%), each of nodes 1 and 3 stops transmitting at synchronization node 704. Node 2 contends for and obtains access to the shared communication channel for transmission of communication burst 1710, which ends at 1711 prior to the next boundary, synchronization boundary 1705.

At 1711, nodes 1 and 3 each regain access to the shared communication channel for transmission of communication bursts 712 and 713, respectively. Upon gaining access to the shared communication channel at 1711, each of nodes 1 and 3 determine that the remaining length of the synchronization period between synchronization boundaries 1704 and 1705, plus the full synchronization period between synchronization boundaries 1705 and 1706 is less than the predetermined excess length. Accordingly, communication bursts 1712 and 1713 span synchronization boundary 1705 and stop transmission at synchronization boundary 1706.

Again, at synchronization boundary 1706, node 2 successfully obtains access to the shared communication channel for transmission of communication burst 1714, which ends at 1715 prior to the next synchronization boundary, synchronization super boundary 1702. Nodes 1 and 3 regain access to the shared communication channel at 1715 for transmission of communication burst 1716 and 1717, respectively, that each end at synchronization super boundary 1702. As synchronously operating nodes, nodes 1 and 3 are obligated to stop all transmissions at any super boundary, such as synchronization super boundary 1702. Node 2 then regains access to the shared communication channel after the contention window beginning at synchronization super boundary 1702 for communication burst 1718.

As noted above, when the predetermined excess length is set to 150%, the average communication burst length may be equal to the synchronization boundary period (within a defined tolerance) under random starting locations of the communication burst.

Figure 18:
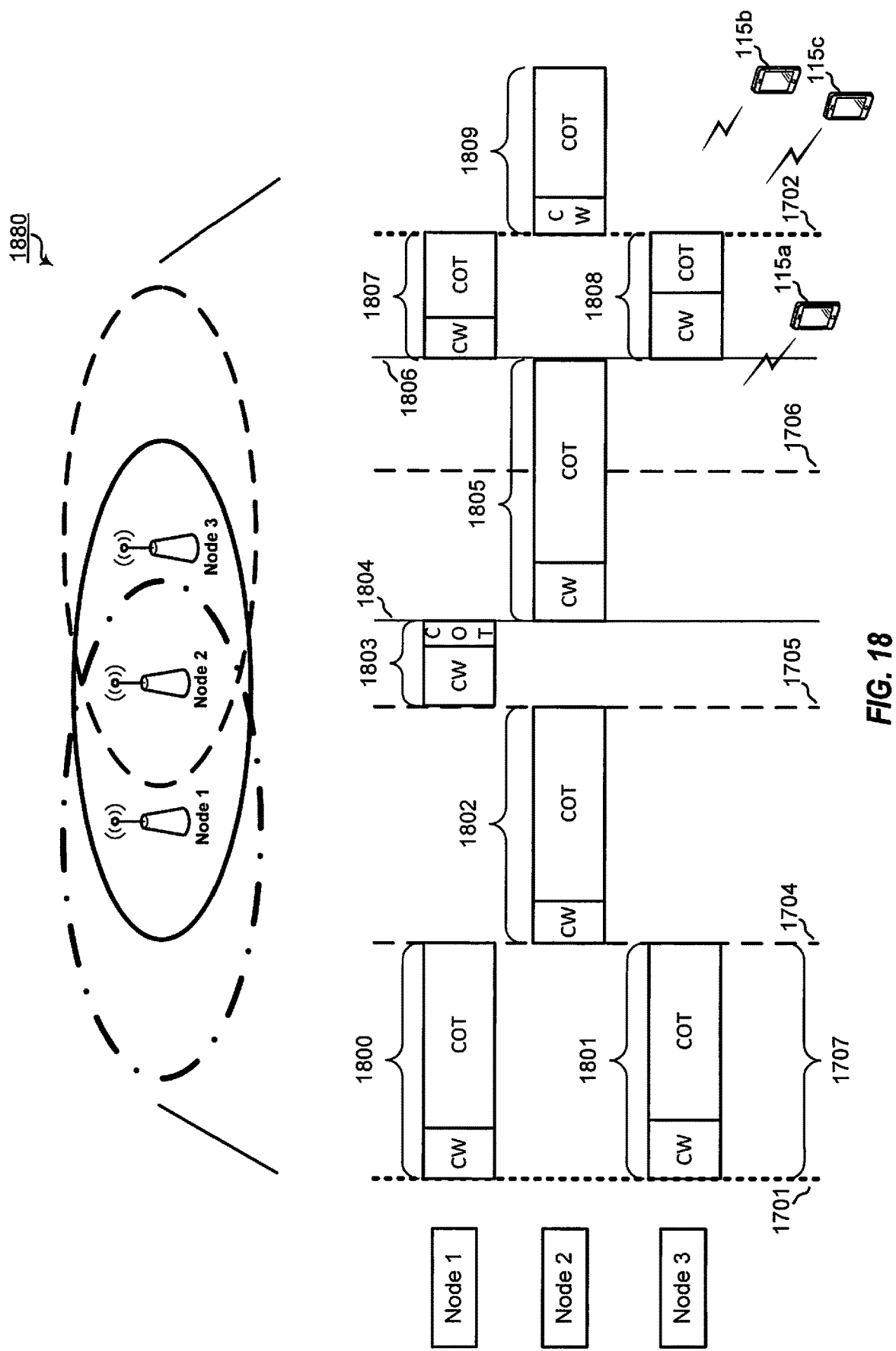
FIG. 18 is a block diagram illustrating a portion of an NR-U network having nodes configured according to one aspect of the present disclosure.

FIG. 18 is a block diagram illustrating a portion of an NR-U network 1880 having nodes 1-3 configured according to one aspect of the present disclosure. As in FIGS. 15, 16, and 17, three wireless nodes, nodes 1-3, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. Periodic synchronization boundaries 1704-1706 and periodic synchronization super boundaries 1701 and 1702 are defined by standards (e.g., FCC standards, etc.), in which nodes 1-3 would have the predefined configuration information, including periodicity 1707 (e.g., 6 ms, 8 ms, etc.), between synchronization boundaries 1704-1706 and a super periodicity 703 of synchronization super boundaries 1701-1702, which may by defined as a number, n, of synchronization boundaries (e.g., n=5, 10, etc.), each defined relative to GNSS time.

As illustrated and described with respect to FIGS. 15, 16, and 17, communication bursts in the aspect illustrated in FIG. 18 may also be defined as the total transmission time of the master device and any associated slave devices including the gaps to switch transmission direction and the idle time of the contention windows immediately prior to the beginning of the transmission. Each communications burst of FIG. 18 may not span more than one synchronization boundary, and when a given node has sufficient data to be transmitted, the communication burst associated with such node may not be shorter than the synchronization boundary period unless the communication burst ends at the synchronization boundary, and if it begins at the synchronization boundary the communication burst will end at the next synchronization boundary. When one of nodes 1-3 of FIG. 18 elects to perform transmission according to the synchronized transmission configuration, the synchronized node is also limited to transmissions of a length equal to the synchronization period, whether beginning at one of synchronization boundaries 1704-1706 or synchronization super boundaries 1701 and 1702.

Communications bursts 1806 and 1807 for synchronized master devices, nodes 1 and 3, may not span synchronization super boundary 1702. With sufficient data to be transmitted, communication bursts 1800 and 1801 may be equal to the synchronization boundary period between synchronization super boundary 1701 and synchronization boundary 1704, unless communication bursts 1800 or 1801 ends at synchronization boundary 1704. This alternative may be illustrated at FIG. 18 after synchronous boundary 1706. At synchronization boundary 1704, node 2 obtains access to the shared channel for transmission of communication burst 1802. At the next boundary, synchronization boundary 1705, node 1 grabs the shared channel for short transmission of communication burst 1803, which ends at 1804. At 1804, synchronization of the system is lost. When regaining access to the shared communication channel, node 2 transmits to its further length, which, while not transmitting synchronously, will still be limited to a length equal to periodicity 1707 beginning at 1804 and ending at 1806. Synchronous nodes, nodes 1 and 3, regain access to the shared communication channel at 1806 for transmission of communication bursts 1807 and 1808, respectively, but, as synchronous nodes, nodes 1 and 3 must end communication bursts 1807 and 1808 at synchronous super boundary 1702. Node 2 may then contend for and obtain access to the shared communication channel for transmission of communication burst 1809. By forcing synchronous nodes to cease transmissions at each of synchronous super boundary, synchronization may be achieved.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 8, 10, and 14 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. In a first aspect, implementing such aspect for wireless communication includes obtaining, by a wireless node, a synchronization boundary configuration for a shared communication channel, wherein the synchronization boundary configuration defines a synchronous contention window and periodicity for synchronous access contention by all accessing nodes of one or more radio access technologies; identifying, by the wireless node, a next synchronous contention window according to the synchronization boundary configuration using an absolute system timing reference; initiating, by the wireless node, a synchronous contention procedure at the next synchronous contention window; conducting, by the wireless node, transmissions according to a result of the synchronous contention procedure; and returning, by the wireless node, to asynchronous access contention for one or more asynchronous contention windows after the next synchronous contention window and prior to a subsequent synchronous contention window.

A second aspect based on the first aspect, further including: ceasing, by the wireless node, all current transmissions on the shared communication channel in response to identification of the next synchronous contention window, wherein the initiating the synchronous contention procedure is performed after the ceasing.

A third aspect based on the first aspect, wherein the synchronous access contention according to the obtaining, the identifying, the initiating, the conducting, and the returning is performed in response to a predetermined node class of the wireless node, wherein the predetermined node class includes one or more of: a power class and a deployment location.

A fourth aspect based on the first aspect, wherein the periodicity is defined for one or more maximum channel occupancy times (MCOTs).

A fifth aspect based on the first aspect, wherein the synchronous contention procedure determines access to the shared communication channel according to one of: a listen before talk (LBT) procedure between one or more equal priority wireless nodes of the one or more radio access technologies; a rotating priority, wherein one or more wireless nodes of the one or more radio access technologies are divided into one or more access groups for which a priority sequence rotates between each of the one or more access groups every synchronous contention window; or a fixed priority, wherein a priority access type is assigned to each of one or more priority wireless nodes having high priority traffic, and a low-priority access type is assigned to each of one or more nodes not having the high priority traffic.

A sixth aspect based on the fifth aspect, wherein the conducting the transmissions includes switching access to another shared communication channel for the transmissions in response to the result of the synchronous contention procedure including the wireless node having the low-priority access type detecting a priority wireless node with a priority access type contending for the shared communication channel.

A seventh aspect based on the first aspect, wherein the obtaining the synchronization boundary configuration includes receiving the synchronization boundary configuration from a synchronization initiating node.

An eighth aspect based on the seventh aspect, wherein the absolute system timing reference is obtained according to one of: autonomously determining the absolute system timing reference within the wireless node; receiving the absolute system timing reference from a neighboring node in a same radio access technology as the wireless node; receiving the absolute system timing reference in a separate radio access technology signal received at the wireless node; or monitoring for the absolute system timing reference in a detected signal from a different radio access technology.

A ninth aspect based on the first aspect, further including: detecting, by the wireless node, success of the synchronous contention procedure; and transmitting, by the wireless node, a signaling grant to a receiver node, wherein the signaling grant provides resources for the receiver node to transmit protection signals prior to an end of the next synchronous contention window.

A tenth aspect based on the ninth aspect, wherein the signaling grant further provides a plurality of additional resources for the receiver node to transmit the protection signals at intervals between the next synchronization contention window and the subsequent synchronization contention window.

An eleventh aspect of wireless communication includes obtaining, by a wireless node, a synchronization boundary configuration for a shared communication channel, wherein the synchronization boundary configuration defines synchronous access parameters for periodic synchronous access contention by all accessing nodes of one or more radio access technologies; attempting, by the wireless node, transmissions on the shared communication channel using a synchronous contention procedure at a next synchronous contention window determined according to the synchronous access parameters; configuring, by the wireless node in response to detection of data for transmission in a buffer of the wireless node, one or more preferred contention windows between the next synchronous contention window and the subsequent synchronous contention window; attempting, by the wireless node, access of the shared communication channel for further transmissions of the data at a next preferred contention window of the one or more preferred contention windows; and in response to success of the access, ceasing, by the wireless node, the further transmissions at a boundary of a subsequent preferred contention window of the one or more preferred contention windows when a portion of the data remains in the buffer.

A twelfth aspect based on the eleventh aspect, wherein the synchronous access parameters further define a synchronous periodicity between the next synchronous contention window and the subsequent synchronous contention window as a multiple of a maximum channel occupancy time (MCOT) for the shared communication channel and a preferred periodicity between each of the one or more preferred contention windows as a single MCOT.

A thirteenth aspect based on the eleventh aspect, further comprising: failing to detect, by the wireless node, the data in the buffer; returning, by the wireless node, to asynchronous access contention for one or more asynchronous contention windows after the next synchronous contention window and prior to the subsequent synchronous contention window; attempting, by the wireless node, other transmissions of new data in the buffer using an asynchronous contention procedure at a next asynchronous contention window of the one or more asynchronous contention windows outside of the one or more preferred contention windows; and continuing, by the wireless node, the other transmission of the new data after success of the asynchronous contention procedure beyond a boundary of the subsequent preferred synchronous contention window when remaining data of the new data remains in the buffer at the boundary.

A fourteenth aspect of wireless communication includes obtaining, by a wireless node, a synchronization boundary configuration for a shared communication channel, wherein the synchronization boundary configuration defines a synchronous contention window and periodicity for synchronous access contention by all accessing nodes of one or more radio access technologies; identifying, by the wireless node, a next synchronous contention window according to the synchronization boundary configuration using an absolute system timing reference; initiating, by the wireless node, a synchronous contention procedure at the next synchronous contention window; conducting, by the wireless node, transmissions using synchronous transmission parameters according to a result of the synchronous contention procedure; and returning, by the wireless node, to asynchronous access contention for one or more asynchronous contention windows after the next synchronous contention window and prior to a subsequent synchronous contention window.

A fifteenth aspect based on the fourteenth aspect, further including: determining, by the wireless node, to perform the identifying, the initiating, and the conducting in response to detection of a communication state of the wireless node identified for synchronous access.

A sixteenth aspect based on the fifteenth aspect, wherein the communication state includes one or more of: a maximum threshold number of failed attempts to access the shared communication channel; or a data buffer filled above a threshold amount of data for transmission.

A seventeenth aspect based on the fourteenth aspect, wherein the synchronous transmission parameters include one or more of: maximum channel occupancy time (MCOT), and backoff window, and wherein the synchronous transmission parameters are more favorable than asynchronous transmission parameters used in transmissions according to the asynchronous access contention.

An eighteenth aspect of wireless communication includes obtaining, by a wireless node, a synchronization boundary configuration for a shared communication channel, wherein the synchronization boundary configuration defines synchronous access parameters for periodic synchronous access contention by all accessing nodes of one or more radio access technologies; deriving, by the wireless node, a plurality of synchronizing boundaries based on the synchronous access parameters relative to an absolute timing reference, wherein the synchronous access parameters include a synchronizing boundary location and a periodicity of the plurality of synchronizing boundaries; determining, by the wireless node, a condition at the wireless node associated with synchronous operation; initiating, by the wireless node in response to the condition, a synchronous contention procedure during a current synchronization period between a last prior synchronizing boundary and a next current synchronizing boundary at the end of the current synchronization period; participating, by the wireless node, in a communication burst in response to success of the synchronous contention procedure, wherein a length of the communication burst is set by the wireless node up to a maximum length of two times the periodicity; and stopping, by the wireless node, the participating in the communication burst at a next synchronizing boundary after the length.

A nineteenth aspect based on the eighteenth aspect, wherein the communication burst includes: idle time during the synchronous contention procedure; transmission time of the wireless node; reception time of the wireless node; and switching time between the transmission time and the reception time.

A twentieth aspect based on the eighteenth aspect, wherein the length of the communication burst is defined according to a predefined percentage of the two times the periodicity.

A twenty-first aspect based on the twentieth aspect, further including: determining, by the wireless node, an available length for the communication burst, wherein the available length includes an available transmission time between the synchronous contention procedure and the next synchronizing boundary; ending, by the wireless node, the communication burst at the next current synchronization boundary in response to one of: the available length exceeding the predefined percentage of the two times the periodicity, wherein the participating and the stopping are in response to the available length satisfying the predefined percentage of the two time the periodicity, and the synchronous contention procedure occurs at the last prior synchronization boundary.

A twenty-second aspect based on the twentieth aspect, wherein the synchronous access parameters further define periodic synchronizing super boundaries within the plurality of synchronizing boundaries located at a super periodicity within the plurality.

A twenty-third aspect of the twenty-second aspect, further including: ending, by the wireless node, the communication burst at a next synchronizing super boundary without regard to the length set by the wireless node.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    obtaining, by a wireless node, a synchronization boundary configuration for a shared communication channel, wherein the synchronization boundary configuration defines a synchronous contention window and periodicity for synchronous access contention by all accessing nodes of one or more radio access technologies;
    identifying, by the wireless node, a next synchronous contention window according to the synchronization boundary configuration using an absolute system timing reference;
    ceasing, by the wireless node, all current transmissions on the shared communication channel in response to identification of the next synchronous contention window;
    after ceasing all current transmissions on the shared communication channel, initiating, by the wireless node, a synchronous contention procedure at the next synchronous contention window;
    conducting, by the wireless node, transmissions according to a result of the synchronous contention procedure; and
    returning, by the wireless node, to asynchronous access contention for one or more asynchronous contention windows after the next synchronous contention window and prior to a subsequent synchronous contention window, wherein the synchronous contention procedure determines access to the shared communication channel according to a rotating priority, wherein one or more wireless nodes of the one or more radio access technologies are divided into one or more access groups for which a priority sequence rotates between each of the one or more access groups every synchronous contention window.

2. The method of claim 1, wherein the synchronous access contention according to the obtaining, the identifying, the initiating, the conducting, and the returning is performed in response to a predetermined node class of the wireless node, wherein the predetermined node class includes one or more of: a power class and a deployment location.

3. The method of claim 1, wherein the periodicity is defined for one or more maximum channel occupancy times (MCOTs).

4. The method of claim 1, wherein the conducting the transmissions includes:
    switching access to another shared communication channel for the transmissions in response to the result of the synchronous contention procedure.

5. The method of claim 1, wherein the obtaining the synchronization boundary configuration includes receiving the synchronization boundary configuration from a synchronization initiating node.

6. The method of claim 1, wherein the absolute system timing reference is obtained according to one of:
    autonomously determining the absolute system timing reference within the wireless node;
    receiving the absolute system timing reference from a neighboring node in a same radio access technology as the wireless node;
    receiving the absolute system timing reference in a separate radio access technology signal received at the wireless node; or
    monitoring for the absolute system timing reference in a detected signal from a different radio access technology.

7. The method of claim 1, further including:
    detecting, by the wireless node, success of the synchronous contention procedure;
    transmitting, by the wireless node, a signaling grant to a receiver node, wherein the signaling grant provides resources for the receiver node to transmit protection signals prior to an end of the next synchronous contention window.

8. The method of claim 7, wherein the signaling grant further provides a plurality of additional resources for the receiver node to transmit the protection signals at intervals between the next synchronization contention window and the subsequent synchronization contention window.

9. A method of wireless communication, comprising:
    obtaining, by a wireless node, a synchronization boundary configuration for a shared communication channel, wherein the synchronization boundary configuration defines a synchronous contention window and periodicity for synchronous access contention by all accessing nodes of one or more radio access technologies;
    identifying, by the wireless node, a next synchronous contention window according to the synchronization boundary configuration using an absolute system timing reference;
    ceasing, by the wireless node, all current transmissions on the shared communication channel in response to identification of the next synchronous contention window;
    after ceasing all current transmissions on the shared communication channel, initiating, by the wireless node, a synchronous contention procedure at the next synchronous contention window;
    conducting, by the wireless node, transmissions using synchronous transmission parameters according to a result of the synchronous contention procedure; and
    returning, by the wireless node, to asynchronous access contention for one or more asynchronous contention windows after the next synchronous contention window and prior to a subsequent synchronous contention window, wherein the synchronous contention procedure determines access to the shared communication channel according to a rotating priority, wherein one or more wireless nodes of the one or more radio access technologies are divided into one or more access groups for which a priority sequence rotates between each of the one or more access groups every synchronous contention window.

10. The method of claim 9, further including:
    determining, by the wireless node, to perform the identifying, the initiating, and the conducting in response to detection of a communication state of the wireless node identified for synchronous access.

11. The method of claim 10, wherein the communication state includes one or more of:
a maximum threshold number of failed attempts to access the shared communication channel; or
a data buffer filled above a threshold amount of data for transmission.

12. The method of claim 9, wherein the synchronous transmission parameters include one or more of: maximum channel occupancy time (MCOT), and backoff window, and
wherein the synchronous transmission parameters are more favorable than asynchronous transmission parameters used in transmissions according to the asynchronous access contention.

13. An apparatus comprising:
one or more wireless radios;
a processor coupled to the one or more wireless radios; and
a memory coupled to the processor and to the one or more wireless radios, wherein:
the memory is configured to store a synchronization boundary configuration for a shared communication channel, wherein the synchronization boundary configuration defines a synchronous contention window and periodicity for synchronous access contention by all accessing nodes of one or more radio access technologies;
the processor is configured to:
identify a next synchronous contention window according to the synchronization boundary configuration using an absolute system timing reference,
cease all current transmissions on the shared communication channel in response to identification of the next synchronous contention window;
after cessation of all current transmissions on the shared communication channel, initiate a synchronous contention procedure at the next synchronous contention window, and
return to asynchronous access contention for one or more asynchronous contention windows after the next synchronous contention window and prior to a subsequent synchronous contention window; and
the one or more wireless radios are configured to conduct transmissions according to a result of the synchronous contention procedure, wherein the synchronous contention procedure determines access to the shared communication channel according to a rotating priority, wherein one or more wireless nodes of the one or more radio access technologies are divided into one or more access groups for which a priority sequence rotates between each of the one or more access groups every synchronous contention window.

14. The apparatus of claim 13, wherein the absolute system timing reference is obtained according to receipt of the absolute system timing reference from a neighboring node in a same radio access technology as the apparatus.

15. The apparatus of claim 13, wherein the absolute system timing reference is obtained according to receipt of the absolute system timing reference in a separate radio access technology signal received at the apparatus.

16. An apparatus comprising:
one or more wireless radios;
a processor coupled to the one or more wireless radios; and
a memory coupled to the processor and to the one or more wireless radios, wherein:
the memory is configured to store a synchronization boundary configuration for a shared communication channel, wherein the synchronization boundary configuration defines a synchronous contention window and periodicity for synchronous access contention by all accessing nodes of one or more radio access technologies;
the processor is configured to:
identify a next synchronous contention window according to the synchronization boundary configuration using an absolute system timing reference,
cease all current transmissions on the shared communication channel in response to identification of the next synchronous contention window,
after cessation of all current transmissions on the shared communication channel, initiate a synchronous contention procedure at the next synchronous contention window, and
return to asynchronous access contention for one or more asynchronous contention windows after the next synchronous contention window and prior to a subsequent synchronous contention window; and
the one or more wireless radios are configured to conduct transmissions using synchronous transmission parameters according to a result of the synchronous contention procedure, wherein the synchronous contention procedure determines access to the shared communication channel according to a rotating priority, wherein one or more wireless nodes of the one or more radio access technologies are divided into one or more access groups for which a priority sequence rotates between each of the one or more access groups every synchronous contention window.

17. The apparatus of claim 16, wherein the one or more wireless radios configured to conduct transmissions using synchronous transmission parameters comprises the one or more radios configured to conduct transmissions using enhanced transmission access parameters, wherein an enhanced transmission access parameter comprises a reduced backoff window.

18. The apparatus of claim 16, wherein the memory comprises synchronous selection logic, wherein the synchronous selection logic is configured to detect a communication state identified for synchronous access, and wherein the communication state includes a data buffer filled above a threshold amount of data for transmission.

19. The apparatus of claim 16, wherein the memory comprises synchronous selection logic, wherein the synchronous selection logic is configured to detect a communication state identified for synchronous access, and wherein the communication state includes a maximum threshold number of failed attempts to access the shared communication channel.

* * * * *